US009686440B2

(12) United States Patent
Metcalfe et al.

(10) Patent No.: US 9,686,440 B2
(45) Date of Patent: Jun. 20, 2017

(54) RENDERING HIGH QUALITY IMAGES VIA MICRO-SEGMENTATION, ERROR DIFFUSION, AND EDGE ENHANCEMENT

(71) Applicant: Intel Corporation, Santa Clara, CA (US)

(72) Inventors: Ryan Metcalfe, Webster, NY (US); Stewart N. Taylor, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 14/594,366

(22) Filed: Jan. 12, 2015

(65) Prior Publication Data

US 2016/0205282 A1 Jul. 14, 2016

(51) Int. Cl.

| | |
|---|---|
| ***H04N 1/40*** | (2006.01) |
| ***H04N 1/409*** | (2006.01) |
| ***H04N 1/58*** | (2006.01) |
| ***H04N 1/60*** | (2006.01) |
| ***G06K 15/02*** | (2006.01) |
| ***H04N 1/405*** | (2006.01) |
| *H04N 1/047* | (2006.01) |

(52) U.S. Cl.

CPC ....... *H04N 1/4052* (2013.01); *G06K 15/1877* (2013.01); *H04N 1/40062* (2013.01); *H04N 1/4092* (2013.01); *H04N 1/58* (2013.01); *H04N 1/6027* (2013.01); *H04N 1/6072* (2013.01); *H04N 1/047* (2013.01)

(58) Field of Classification Search

None

See application file for complete search history.

(56) References Cited

U.S. PATENT DOCUMENTS

| | | | | |
|---|---|---|---|---|
| 2004/0010633 | A1* | 1/2004 | Ishikawa .............. | H04N 1/4057 710/1 |
| 2004/0257619 | A1* | 12/2004 | Loce et al. ...................... | 358/2.1 |
| 2005/0219567 | A1* | 10/2005 | Gupta ...................... | H04N 1/52 358/1.9 |
| 2011/0085735 | A1* | 4/2011 | Malik ................... | G06T 7/0083 382/199 |

* cited by examiner

*Primary Examiner* — Scott A Rogers

(74) *Attorney, Agent, or Firm* — Green, Howard, & Mughal, LLP

(57) ABSTRACT

Techniques related to rendering scanned images are discussed. Such techniques may include selectively processing segments of a scanned input image based on a neutral edge tag signal such that segments are color suppressed and edge enhanced when the neutral edge tag signal is asserted and error diffusion processed when the neutral edge tag signal is not asserted.

18 Claims, 11 Drawing Sheets

RENDERING HIGH QUALITY IMAGES VIA MICRO-SEGMENTATION, ERROR DIFFUSION, AND EDGE ENHANCEMENT

BACKGROUND

In image processing, error diffusion may be used to render a continuous tone image on a binary output marking engine (e.g., a copier, printer, or the like). Error diffusion may be used in multi-function devices (MFDs) to render print-ready bitmaps from scanned monochrome and/or color images. Error diffusion generally provide favorable rendering features without generating artifacts (e.g., moiré artifacts or the like). Furthermore, error diffusion provides a good compromise relative to image quality when processing documents with mixed content since it preserves the image density of photographs rendering text, line-art, and graphics with relatively good results.

However, due to the overall spatial frequency response or modulation transfer function (MTF) of many scanners, the edges of objects and text contained within a scanned RGB (red-green-blue color space) contone image are blurred, resulting in edge-degradation within the printed text. In other words, a lower text-quality may be rendered, especially along edges, via error diffusion and therefore deemed objectionable by some consumers who demand high print image quality.

For example, in a synthetically generated contone 8-bits/pixel (8 bpp) image (e.g., a computer generated image), an edge may be "perfect" such that it abruptly transitions from white (e.g., a value of 0) to black (e.g., a value of 255) across an edge without intervening values. For example, such a perfect edge may be provided at a text boundary or a line boundary or the like. However, in a scanned contone image with a typical modulation transfer function of the same or similar text boundary or line boundary or the like, the scanned edge may transition from white (0) to black (255) with intervening values (between 0 and 255) having a sigmoid type shape or the like.

In generating a print ready binary image from such a scanned image, for example, the image processing technique may have to choose between white or black (in binary images) or a limited range of options (e.g., intensity of 0 to 3 in two bit implementations) for such transition values. In one error diffusion algorithm (e.g., the Floyd & Steinberg algorithm), after choosing the value of the current pixel (from the limited options as discussed), the generated error component is diffused to the downstream neighboring pixels. For example, the generated error may be determined as the difference between the desired and printed values. In such a case, the desired value is the input gray pixel level (e.g., the pixel value from the scanned contone image) and the printed value is either 255 or 0 (in the binary example). Since the 8 bpp scan image is typically blurred relative to an ideal or synthetic image (as discussed), the error that is generated within these regions when processed via error diffusion may result in sporadic pixels around these (edge) transitions. For example, from a high-level visual perspective, the edges of text and lines are therefore not as sharp as desired.

Precise and well-defined edges of black text and line-art is an important rendering feature expected or desired by customers using high-resolution printers and MFDs. It is with respect to these and other considerations that the present improvements have been needed. Such improvements may become critical as the desire to attain from scanning and subsequently print high quality images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
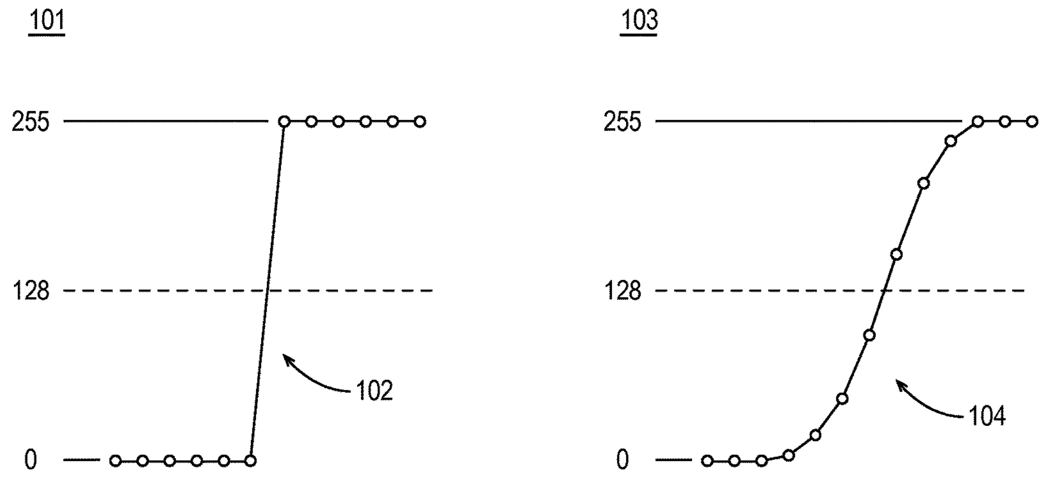
FIG. 1 is a diagram illustrating example edge transition profiles.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to rendering scanned images and, in particular, to applying error diffusion to a first segment of a scanned image and thresholding to a second segment of the scanned image based on a neutral edge tag signal associated with the scanned image.

As described above, in generating a print ready binary image from a scanned image, image processing technique may have to choose between white or black (in binary images) or a limited range of options (e.g., intensity of 0 to 3 in two bit implementations) for locations (e.g., pixel locations) within the image. Furthermore, print ready binary images may include similar choices for other color channels such as cyan, magenta, and yellow in a CMYK (cyan, magenta, yellow, key or black) color space. In such contexts, error diffusion may be applied to choose such values and to propagate errors to neighboring pixel locations. Such techniques may provide a compromise for processing mixed content documents. However, as discussed, such techniques may result in sporadic pixels around edge regions such that edges of texts and lines are not as sharp as desired.

FIG. 1 is a diagram illustrating example edge transition profiles, arranged in accordance with at least some implementations of the present disclosure. For example, FIG. 1 illustrates a synthetic edge profile 101 (e.g., a "perfect" profile) that may be encountered within a synthetically generated contone image (e.g., an 8-bits/pixel image). For example, synthetic edge profile 101 may be a profile generated via a print function from software such as word processing software or the like. As shown, synthetic edge profile 101 includes a transition 102 from a value of 0 to a value of 255 (e.g., between white and black) without any intermediate values. For example, transition 102 may be an abrupt transition ideal for generating a print ready binary image.

Figure 2:
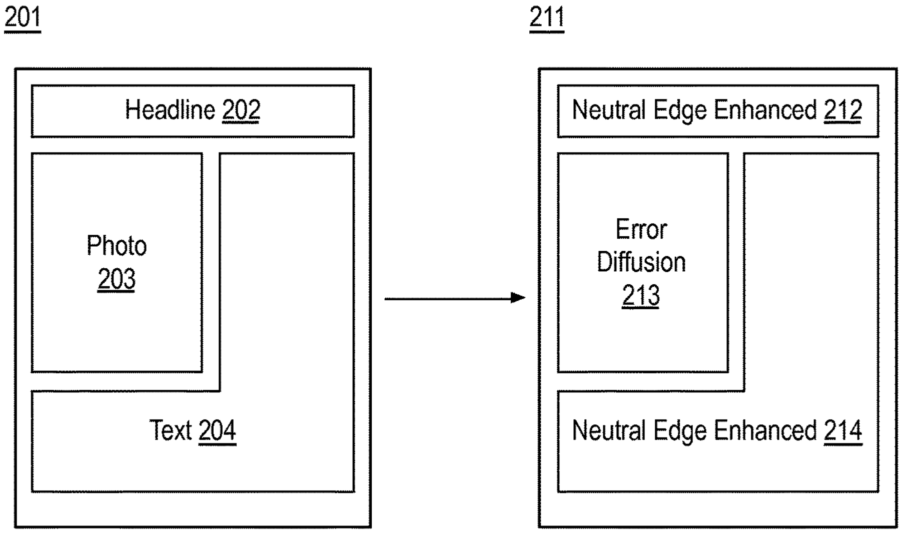
FIG. 2 is a diagram of an example mixed content scanned image and an example output image.

FIG. 1 also illustrates an example scanned edge profile 103. For example, scanned edge profile 103 may be encountered in a scanned image such as a scanned input image generated via a multi-function devices (MFD), scanner, or the like. As shown, scanned edge profile 103 may include a transition 104 having a curved shape or sigmoid curved shape or the like transitioning from a value of 0 to a value of 255 (e.g., between white and black) with several intermediary values in the scanned image (e.g., an 8 bpp RGB contone image or the like). Such a transition may be typical in multi-function devices due to the overall spatial frequency response of the scanner integrated in the device. Although discussed with respect to a curved shape, scanned edge profile 103 may be any shape having intermediary values. In generating a print ready binary image, scanned edge profile 103 may cause difficulties. For example, print ready binary images may have to choose between white or black (in true binary images) or a limited range of options (e.g., intensity vales of 0, 1, 2, or 3 in two bit per pixel image implementations) for such transition values. It may be desirable to process such edge profiles to generate well-defined and sharp edges to improve the quality of some scanned images. For example, such scanned edge profiles may be common in text regions of an image, line-art regions of an image, graphics including edges, or the like. Furthermore, mixed content images are common such that some portions of an image include text, line art, or other regions including edges or the like such that scanned edges FIG. 2 is a diagram of an example mixed content scanned image 201 and an example output image 211, arranged in accordance with at least some implementations of the present disclosure. As shown in FIG. 2, mixed content scanned image 201 may include regions of differing content such as a headline 202, a photograph 203, and a text region 204. Mixed content scanned image 201 may include any content or combination of content such as line-art regions, graphics regions, or the like. For example, text region 204 and headline 202 may have several scanned edge profiles as discussed with respect to scanned edge profile 103 while photograph 203 may not include such edge profiles and may instead include few if any edges.

FIG. 2 also illustrates output image 211, which, as shown, may include an error diffusion rendered segment 213 and neutral edge enhanced segments 212, 214. For example, error diffusion rendered segment 213 may be rendered using error diffusion techniques such as applying error diffusion to one or more color channels of mixed content scanned image 201 for error diffusion rendered segment 213 (and corresponding to photograph 203) as is discussed further herein. Neutral edge enhanced segments 212, 214 may be processed using thresholding techniques to a key or black color channel of mixed content scanned image 201 within headline 202 and text region 204, respectively, to generate neutral edge enhanced segments 212, 214, as is discussed further herein. Furthermore, neutral edge enhanced segments 212, 214 may be processed by suppressing other color channels of mixed content scanned image 201 within headline 202 and text region 204, respectively, to generate neutral edge enhanced segments 212, 214. For example, such selective processing may be performed based on a neutral edge tag signal (e.g. a signal indicating, on a pixel by pixel basis, whether a pixel is indicated with a neutral edge tag).

Although illustrated in FIG. 2 with respect to discrete segments or regions of output image 211, such selective processing may be performed on a micro-segment basis or a pixel by pixel basis (e.g., via pixel classification) such that sub-segments of text region 204 are processed using error diffusion and other sub-segments are processed using thresholding and/or color suppression techniques. Similarly, headline 202 and photograph 203 may be processed with a combination of error diffusion and thresholding techniques as is discussed further herein.

Such selective processing on segments, micro-segments, or on a pixel-by-pixel basis may provide for error diffusion results for segments or the like without edges while providing edge enhanced processing for edges. For example, selective processing may be based on the assertion of a neutral edge tag signal. Such processing may provide sharper edges and may partially or completely resolve difficulties in transitioning from scanned edge profiles to edge profiles suitable for printing such as in print ready binary images.

For example, in some embodiments, a scanned input image including multiple color channels may be received. The scanned input image may be in any color space such as the Lab (e.g., L for lightness and a* b* color components) color space and/or a CMYK color space. In some examples, data from both color spaces may be available for processing. Error diffusion may be applied to one or more color channels of the scanned input image for a first segment of the scanned input image to generate an error diffusion rendered segment of an output image. For example, error diffusion may include choosing a value for a current pixel, calculating an error value based on the chosen value, and propagating the error value to neighboring pixels. Furthermore, thresholding may be applied to one or more of the color channels of the scanned input image for a second segment based on a neutral edge tag signal to generate a neutral edge enhanced segment of the output image. Such thresholding may include, for example, forcing pixel values to white or black (or suppressing them) based on the neutral edge tag signal. Furthermore, in some examples, non-black color channels may also be suppressed based on the neutral edge tag signal. For example, the output image may include a print ready binary image and the neutral edge enhanced segment may include enhanced edges that are sharper (e.g., with less edge blur), more precise and well-defined, and thereby the print quality of the output image may be improved.

Figure 3:
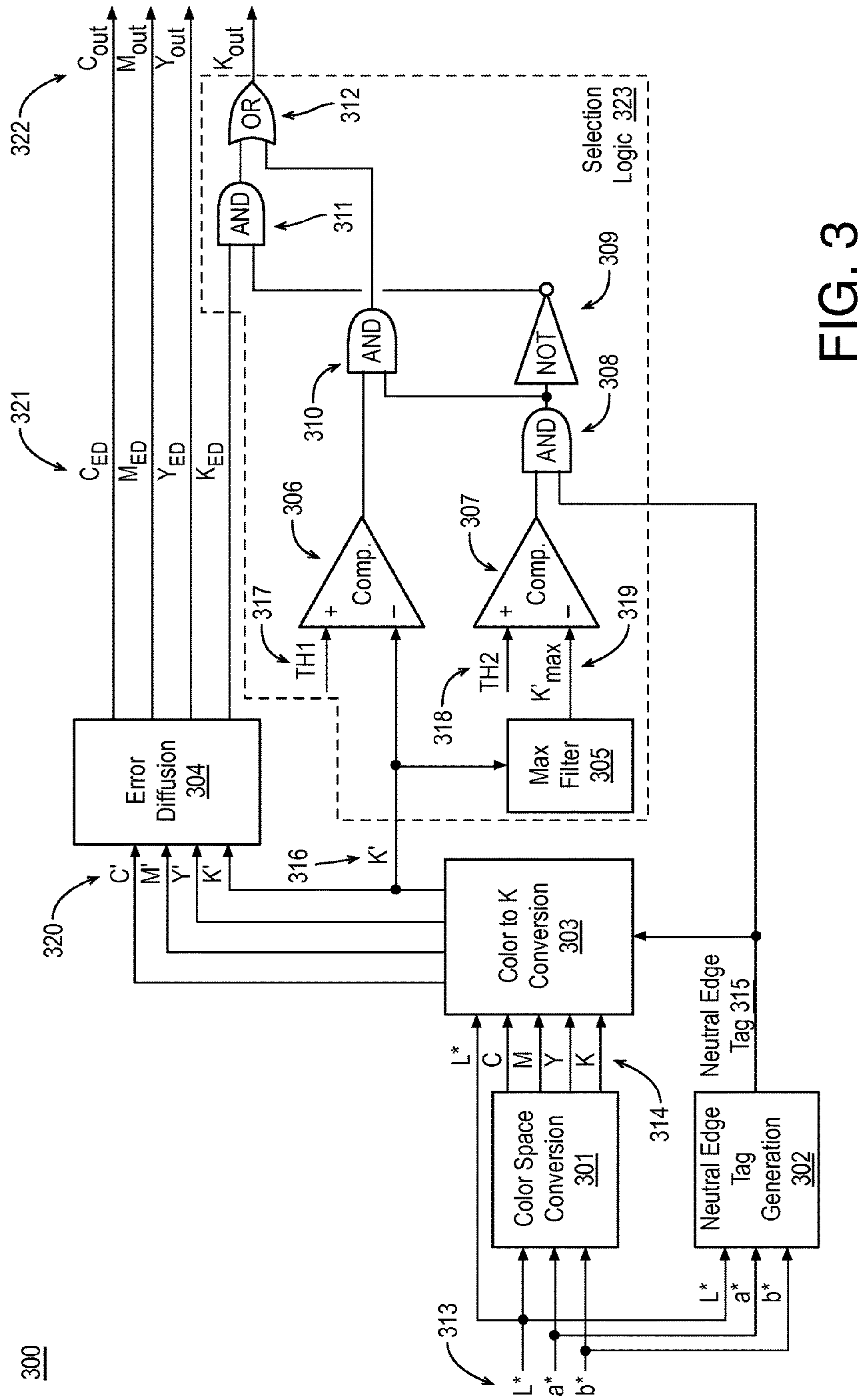
FIG. 3 is a block diagram illustrating an example device for rendering a scanned image.

FIG. 3 is a block diagram illustrating an example device 300 for rendering a scanned image, arranged in accordance with at least some implementations of the present disclosure. As shown in FIG. 3, device 300 may include a color space conversion module 301, a neutral edge tag generation module 302, a color to key color (color to K) conversion module 303, an error diffusion module 304, and selection logic 323. Device 300 may include any suitable device such as a multi-function device (MFD) (e.g., a copier, printer, scanner all in one device) or a computing device such as a computer, laptop computer, tablet, smart phone, or the like. For example, device 300 may be any device that may render a scanned image such as scanned input image 313. Furthermore, a scanned image may be preprocessed to generated scanned input image 313. For example, a scanned image in the RGB (red, green, blue) color space may be converted to the 3-dimensional Lab color space. For example, in the Lab color space, the L* component or channel may include brightness information and the a* and b* components or channels may contain colorimetric information (e.g., hue, saturation, etc.). Furthermore, although illustrated with respect to the Lab color space, scanned input image 313 may be in any color space such as RGB, YCbCr (luma, blue difference, red difference), CMYK, or the like. The scanned input image(s) may be generated via device 300 or they may be received via an external device. In some examples, device 300 may be implemented via a cloud computing environment.

As shown, device 300 may generate or receive scanned input image 313 and color space conversion module 301 of device 300 may convert scanned input image 313 from one color space to another to generated converted input image 314. In the illustrated example, color space conversion module 301 may convert scanned input image 313 from the Lab color space to the subtractive CMYK color space. For example, the CMYK color space may be suitable for and, in some contexts, required for color printing applications. In some examples, color space conversion module 301 may implement a tetrahedral interpolation and color space conversion module 301 may be described as a tetrahedral interpolation module. For example, color space conversion module 301 may partition the CMYK gamut into coarser points via upper most significant bits (MSBs) of the Lab input image. The lower least significant bits (LSBs) may be used to determine which tetrahedron a data point is located within and to interpolate between the corresponding four lattice nodes (e.g., nodes of the tetrahedron). Such techniques may eliminate the need for storing direct one-to-one look up tables (LUTs) for the conversion, which may be prohibitively expensive in terms of memory and processing requirements (e.g., each color separation may require 16 Mbytes). Although discussed with respect to tetrahedral interpolation, color space conversion module 301 may use any color space conversion techniques such as trilinear interpolation or the like. As shown, in some examples, converted input image 314 may include CMYK components or channels, although any suitable color space may be used. Furthermore, as used herein, the term scanned input image may include scanned input image 313 and/or converted input image 314 and/or any other image data associated with a scanned image.

Figure 5:
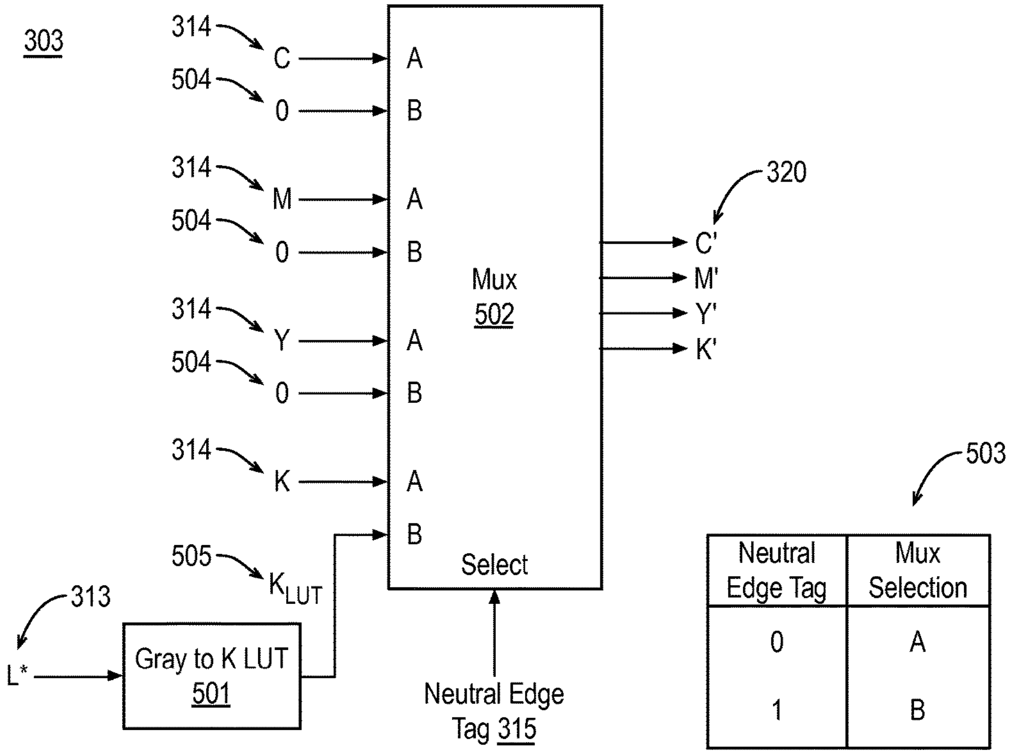
FIG. 5 is a block diagram illustrating an example color to key color conversion module.

Converted input image 314 may be provided to color to key color conversion module 303, which may generate color converted image 320 (represented as C', M', Y', K'), as is discussed further herein with respect to FIG. 5. For example, color to key color conversion module 303 may suppress color channels (e.g., CMY color channels) of converted input image 314 and/or selectively apply a gray to key color conversion to a channel (e.g., L* color channel) of scanned input image 313 based on neutral edge tag signal 315 to generate color converted image 320. For example, such color suppression and/or gray to key color conversion may suppress colors at neutral edges of scanned input image 313 to reduce edge fringing or the like. Furthermore, such selective gray to key color conversion may provide a non-linear transformation to match luminance-to-toner or luminance-to-inkdrop output response to improve image quality and/or save on ink usage.

As shown, color converted image 320 may be provided to error diffusion module 304. Error diffusion module 304 may receive color converted image 320 and may provide an error diffusion image 321. For example, error diffusion image 321 may include CMYK color components for channels represented as $C_{ED}$, $M_{ED}$, $Y_{ED}$, and $K_{ED}$. However, as discussed, error diffusion image 321 may be in any suitable color space. Error diffusion module 304 may apply any suitable error diffusion technique or techniques such that a binary value (in true binary contexts) or a resultant value (in implementations using 0 to 3 or more selection options) may be chosen, on a pixel-by-pixel basis, for each component or channel of error diffusion image 321 and such that the error in such selections may be propagated to neighboring pixels. For example, error diffusion module 304 may render a continuous tone image on a binary marking engine. In true binary examples, at each pixel location within color converted image 320, error diffusion module 304 (via a binary marking engine or the like) may select (e.g., for printing) a dot (1) or not (0). For example, in true binary implementations no other values may be available. In implementations with more selection options such as 2-bit per pixel implementations with selection options of 0, 1, 2, 3, which may vary based on intensity or dot size or the like, at each pixel location within color converted image 320, error diffusion module 304 may select among such selection options.

When printing, for example, grayscale content (e.g., 8 bpp gray values between 0 and 255), error diffusion module 304 may make selections to print a dot pattern that, on average, matches the grayscale intensity value of color converted image 320. However, at each particular pixel location, an error may be made between the selection and the desired (e.g., actual value in the grayscale content) value. For example, if the desired gray level value is at or above a threshold (e.g., 128), a dot may be printed and, if the desired gray level value is below the threshold, no dot may be printed (in the true binary context). Based on the desired gray level value and the selection, error diffusion module 304 may generate an error associated with the grayscale to binary conversion for the current pixel. For example, the error may be Error=Desired−PrintedLevel, where error is the error for the current pixel, Desired is the grayscale level value for the current pixel, and PrintedLevel is the selected value converted to match the dimensions of the grayscale level value (e.g., 0 to 255).

Error diffusion module 304 may distribute or diffuse the error to neighboring pixels such that no gray-level (e.g., density) information is lost. For example, one-half of the error may be distributed to the next pixel in the current scan line and one-half of the error may be distributed among four pixels in the next scan line. However, any such error diffusion techniques may be used. Such techniques may provide suitable results for segments of a scanned input image having few or no neutral edges such as photographs or the like, as discussed herein.

Using such techniques, error diffusion image 321 may include CMYK color components for channels represented as $C_{ED}$, $M_{ED}$, $Y_{ED}$, and $K_{ED}$ such that the value, at each pixel location, of error diffusion image 321 may be 0 or 1 in true binary contexts (e.g., error diffusion image 321 may be a 1 bpp bitmap) that may be ready or suitable for printing. In other contexts, error diffusion image 321 may include CMYK color components for channels represented as $C_{ED}$, $M_{ED}$, $Y_{ED}$, and $K_{ED}$ such that the value, at each pixel location, of error diffusion image 321 may be 0, 1, 2, 3 (e.g., in 2 bpp implementations) or any other suitable selection value that is suitable for printing. As is discussed further below, the key or black component of error diffusion image 321 (e.g., $K_{ED}$) may be provided to selection logic 323. Selection logic 323 may support selectively applying error diffusion or thresholding to different segments, regions, or pixels of scanned input image 313 to generate output image 322.

Furthermore, as shown in FIG. 3, scanned input image 313 may be provided to neutral edge tag generation module 302. As shown in FIG. 3, neutral edge tag generation module 302 may receive scanned input image 313 and, as is discussed further herein with respect to FIG. 4, neutral edge tag generation module 302 may generate neutral edge tag signal 315. Neutral edge tag signal 315 may include, for each pixel of scanned input image 313, an indicator associated with a determination of whether the pixel is a neutral edge pixel or not. Neutral edge tag signal 315 may include any suitable data or signal such as a binary signal (or bitmask) for scanned input image 313 such that the binary signal indicates a pixel is determined to be a neutral edge pixel (1) or not (0).

Furthermore, as shown in FIG. 3, selection logic 323 may receive neutral edge tag signal 315, the key color channel of color converted image 316 (e.g., K'), and the key color channel of error diffusion image 321 (e.g., $K_{ED}$) and selection logic 323, may determine the key color channel of output image 322 (e.g., $K_{out}$). For example, for regions, segments, or pixels of scanned input image 313 where neutral edge tag signal 315 is not asserted (e.g., no neutral edge tag is determined), selection logic 323 may provide $K_{out}$ as $K_{ED}$. For regions, segments, or pixels of scanned input image 313 where neutral edge tag signal 315 is asserted (e.g., an neutral edge tag is determined), selection logic 323 may compare a maximum pixel value in a window around the current pixel to a threshold and selection logic 323 may compare a pixel value of the current pixel to another threshold. If both the thresholds are exceeded, selection logic 323 may provide a value of black for the current pixel (e.g., $K_{out}$=1). If the maximum pixel value exceeds its threshold and the pixel value does not, selection logic 323 may provide a value of white for the current pixel (e.g., $K_{out}$=1). If the maximum pixel value does not exceed its threshold, selection logic 323 may provide $K_{ED}$ as the output (e.g., $K_{out}$=$K_{ED}$). Such processing may provide a thresholding when neutral edge tag signal 315 is asserted such that, when the maximum pixel value threshold is met, error diffusion values (e.g., $K_{ED}$) may be unselected and such that, in some cases, error values may be lost or not propagated to neighbor pixel values. Such thresholding may provide for sharper edges when neutral edge tag signal 315 is asserted. Furthermore, as discussed, neutral edge tag signal 315, when asserted via color to key color conversion module 303) may suppress or eliminate color channels C', M', Y' and, thereby, $C_{ED}$, $M_{ED}$, $Y_{ED}$ and $C_{out}$, $M_{out}$, $Y_{out}$. Such color suppression may also provide sharper edges (by eliminating color flares or the like.

Selection logic 323 may be implemented via any suitable technique or techniques. For example, selection logic 323 may be implemented via software, firmware, hardware, or a combination thereof. In some examples, selection logic 323 (and other modules of device 300) may be implemented via an application specific integrated circuit. Furthermore, as discussed, output image 322 may include a true 1 bpp binary image (e.g., a value of 0 or 1 for each channel at each pixel location), a 2 bpp image, or the like. In the example of FIG. 3, selection logic 323 includes example logic or modules for generating a true 1 bpp output image. However, such logic or modules may be modified to generate 2 bpp output images or any granularity of output image. Furthermore, as discussed herein, in some examples, output image 322 may be a print ready image. However, output image 322 may be any suitable image data or image format such that output image 322 may be stored for presentation via a display device or the like.

In some embodiments, as shown in FIG. 3, selection logic 323 may include a max filter 305, comparators 306, 307, AND gates 308, 310, 311, a NOT gate 309, and an OR gate 312. Furthermore, selection logic 323 may provide or receive a threshold (TH1) 317 and a threshold (TH2) 318. For example, threshold 317 may be associated with a pixel value and may be labeled a pixel value threshold and threshold 318 may be associated with a maximum pixel window value and may be labeled a maximum pixel window value threshold. As shown, max filter 305 of selection logic 323 may receive the key color channel of color converted image 316 (e.g., K'). Based on the key color channel of color converted image key color channel of color converted image 316, max filter 305 may generate, for a pixel, a maximum filter value ($K'_{max}$) 319 in a pixel window around the pixel. For example, max filter 305 may apply a filter around the pixel and determine a maximum value within the window. For example, max filter 305 may apply a 3×3 filter around the pixel such that a 3×3 pixel window (e.g., including the pixel and the pixels above, below, left, right, above-left, above-right, below-left, and below-right with respect to the pixel) may be provided. However, any size pixel window including any number of pixels may be used. For example, the pixel window may be a 4×4 pixel window or larger that uses all of the available pixel values or only a subset (e.g., in a predetermined pattern) of pixels.

As shown, comparator 307 may receive maximum filter value 319 and threshold 318. Comparator 307 may compare maximum filter value 319 to threshold 318 and provide a logic value to AND gate 308 based on the comparison. For example, if the maximum filter value 319 is greater than threshold 318 (or greater than or equal to in some examples), comparator 307 may provide a logical true or bit of 1 to AND gate 308. As shown, AND gate 308 may receive the logical value from comparator 307 as well as neutral edge tag signal 315. AND gate 308 may apply an AND logic function to the received logic signal from comparator 307 and neutral edge tag signal 315 and provide an output such that the output is true or a bit of 1 if both the received logic signal from comparator 307 is true (or asserted) and neutral edge tag signal 315 is true (or asserted).

As shown, the logic signal from AND gate 308 may be provided to NOT gate 309 and AND gate 310. For example, NOT gate 309 may flip the result or signal of the logic signal from AND gate 308 (e.g., change true to false and vice versa) and may provide the resultant logic signal to AND gate 311. Also as shown, AND gate 310 may receive the logic signal from AND gate 308 and the logic signal from comparator 306. For example, as shown, comparator 306 may receive key color channel of color converted image 316 and threshold 317. Comparator 306 may compare key color channel of color converted image 316 to threshold 317 and provide a logic value to AND gate 310 based on the comparison. For example, if the key color channel of color converted image 316 is greater than threshold 317 (or greater than or equal to in some examples), comparator 306 may provide a logical true or bit of 1 to AND gate 310. As shown, AND gate 310 may receive the logical value from comparator 306 as well as the logic signal from AND gate 308 and the logic signal. AND gate 310 may apply an AND logic function to the received logical value from comparator 306 and the logic signal from AND gate 308 and provide an output such that the output is true or a bit of 1 if both logical value from comparator 306 logical value from comparator 306 as well as the logic signal from AND gate 308 is true (or asserted) and the logic signal from AND gate 308 is true (or asserted). As shown, the logical signal from AND gate 311 may be provided to OR gate 312.

As discussed, AND gate 311 may receive the logic signal from NOT gate 309. Also, as shown, AND gate 311 may also receive the key or black component of error diffusion image 321 (e.g., $K_{ED}$). AND gate 311 may apply an AND logic function such that if the logic signal from NOT gate 309 is true or 1 or asserted, $K_{ED}$ may be provided to OR gate 312 and if the logic signal from NOT gate 309 is false or 0 or not asserted, $K_{ED}$ may not be provided to OR gate 312. As shown, OR gate 312 may provide the key or black color channel of output image 322 (e.g., $K_{out}$) based on the inputs to OR gate 312. For example, as discussed, if $K_{ED}$ is provided to OR gate 312, $K_{ED}$ may be provided as $K_{out}$ and, if $K_{ED}$ is not provided to OR gate 312, the value from AND gate 310 (e.g., 1 for a thresholding to black or 0 for a thresholding to white) may be provided.

For example, selection logic 323 may provide for $K_{ED}$ when neutral edge tag signal 315 is not asserted (e.g., via a false result from AND gate 308, a true result from NOT gate 309 and $K_{ED}$ being provided from AND gate 311 to OR gate 312 as well as a false result from AND gate 310 being provided to OR gate 312). Furthermore, selection logic 323 may provide for $K_{ED}$ when neutral edge tag signal 315 is asserted but maximum filter value 319 is less than threshold 318 (e.g., via a false from AND gate 308, a true result from NOT gate 309 and $K_{ED}$ being provided from AND gate 311 as well as a false result from AND gate 310 being provided to OR gate 312).

Further still, selection logic 323 may provide for a value of 0 or white when neutral edge tag signal 315 is asserted, maximum filter value 319 is greater than threshold 318, and key color channel of color converted image 316 is less than threshold 317 (e.g., via a true result from AND gate 308, a false result from NOT gate 309, a false result from AND gate 311 as well as a false or 0 result from comparator 306 and a false or 0 result from AND gate 311 to OR gate 312, resulting in a 0 or white result from OR gate 312). Finally, selection logic 323 may provide for a value of 1 or black when neutral edge tag signal 315 is asserted, maximum filter value 319 is greater than threshold 318, and key color channel of color converted image 316 is greater than threshold 317 (e.g., via a true result from AND gate 308, a false result from NOT gate 309, a false result from AND gate 311 as well as a true or 1 result from comparator 306 and a true or 1 result from AND gate 311 to OR gate 312, resulting in a 1 or black result from OR gate 312).

Figure 6:
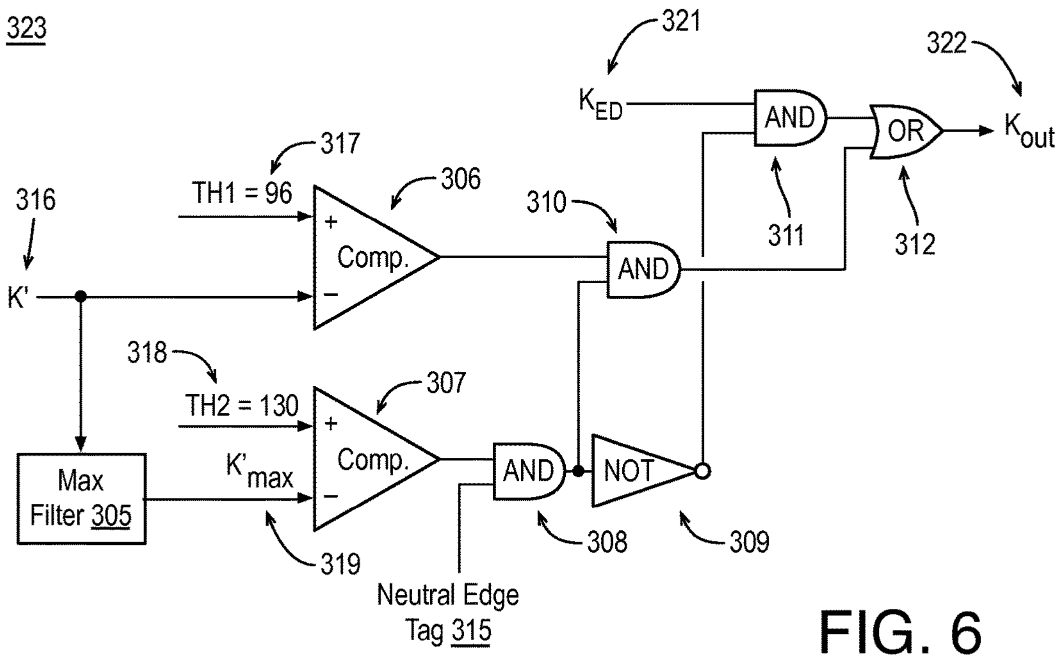
FIG. 6 is a block diagram illustrating example selection logic.

Such results are discussed and summarized further herein with respect to FIG. 6. As discussed, the implementation of selection logic 323 illustrated in FIG. 3 may provide an example for a print ready true binary output image 322. However, as discussed herein, selection logic 323 may generate output image 322 in any suitable format. For example, each pixel of output image 322 may include a selection among more than 2 (e.g., binary) results such as 2 bit per pixel implementations or more selections per pixel positions. In some examples, color to key color conversion module 303 may suppress color channels based on neutral edge tag signal 315 and selection logic 323 may provide thresholding of a key color channel based on neutral edge tag signal 315 and a comparison of the key color channel to a threshold. For example, if neutral edge tag signal 315 is asserted, the key color channel may be thresholded based on the value of the key color channel (e.g., key color channel of color converted image 316, K'). Furthermore, optionally, additional information may be used in the selection of the key color channel based on a thresholding of a maximum key color channel value around the current pixel (e.g., maximum filter value 319, $K'_{max}$).

As discussed, neutral edge tag signal 315 may include, for each pixel of scanned input image 313, an indicator associated with a determination of whether the pixel is a neutral edge pixel or not. Neutral edge tag signal 315 may be generated using any suitable technique or techniques.

Figure 4:
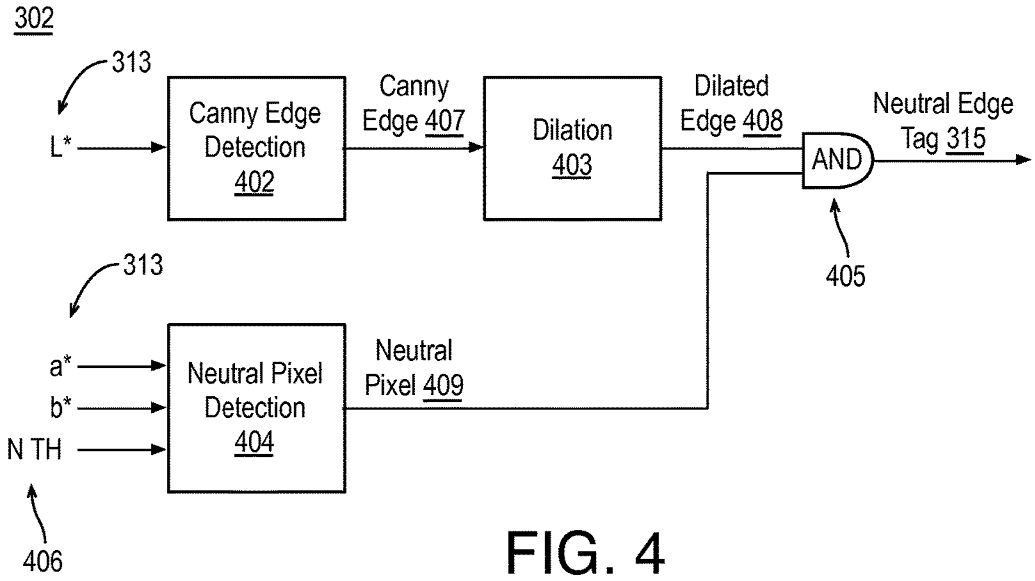
FIG. 4 is a block diagram illustrating an example neutral edge tag generation module for generating neutral edge tag signal.

FIG. 4 is a block diagram illustrating an example neutral edge tag generation module 302 for generating neutral edge tag signal 315, arranged in accordance with at least some implementations of the present disclosure. As shown in FIG. 4, in some examples, neutral edge tag generation module 302 may include a canny edge detection module 402, a dilation module 403, a neutral pixel detection module 404, and an AND gate 405. As shown, canny edge detection module 402 may receive a brightness channel, L*, of scanned input image 313. Canny edge detection module 402 may apply canny edge detection by suppressing noise in the brightness channel, L*, and determine image gradients to highlight regions where high spatial derivatives exist. Canny edge detection module 402 may also apply hysteresis (e.g., with two distinct threshold levels) to improve the detected edges. Detected edges within scanned input image 313 may be provided as canny edge signal 407. Canny edge signal 407 may include any suitable data indicating edges within scanned input image 313 such as, for example, a bit pattern such that pixel locations having a determined edge are labeled as 1 and pixel locations without a determined edge are labeled as 0.

As shown, canny edge signal 407 may be provided to dilation module 403. Dilation module 403 may receive canny edge signal 407 and may apply a dilation such as a 3×3 dilation or the like to canny edge signal 407 to adjust the edge signal to control spatial extension around areas of text and lines (for example) to capture and suppress color fringing (e.g., via color to key color conversion module 303). For example, dilation module 403 may increase the size of canny edge signal 407 by a dilation area such as 3×3 dilation area or the like. Dilation module 403 may provide a dilated edge signal 408. Dilated edge signal 408 may include any suitable data indicating edges within scanned input image 313 such as, for example, a bit pattern such that pixel locations having a determined edge are labeled as 1 and pixel locations without a determined edge are labeled as 0. As shown, dilated edge signal 408 may be provided to AND gate 405.

Also as shown, neutral pixel detection module 404 may receive color channels, a* and b*, of scanned input image 313. As discussed, the color channels of scanned input image 313 may contain colorimetric information (e.g., hue, saturation, etc.) or the like. Furthermore, neutral pixel detection module 404 may receive a neutral threshold (N TH) 406. For example, neutral pixel detection module 404 may evaluate the color channels of scanned input image 313 to generate a neutral pixel signal 409. In an embodiment, neutral pixel detection module 404 may determine whether the color channels are substantially neutral (e.g., gray). In some examples, the color channels, a* and b*, may be neutral (e.g., gray) around an origin of a color map containing the color channels. In some examples, neutral pixel detection module 404 may determine a neutral pixel detection signal 409 for a pixel of scanned input image 313 may comparing the sum of the color channel values (e.g., the values of color channels a* and b*) to threshold 406. For example, neutral pixel signal 409 may assert a 1 bpp signal if the sum of a* and b* is less than threshold 406. For example, neutral pixel signal 409 may emulate a chroma magnitude component of the color channels of scanned input image 313. As shown, neutral pixel detection module 404 may provide neutral pixel signal 409 to AND gate 405.

As discussed, AND gate 405 may receive dilated edge signal 408 and neutral pixel signal 409 and AND gate 405 may provide neutral edge tag signal 315 based on a logical AND function applied to dilated edge signal 408 and neutral pixel signal 409. For example, neutral edge tag signal 315 may be true or 1 or asserted for a pixel when dilated edge signal 408 and neutral pixel signal 409 are both true or 1 or asserted and neutral edge tag signal 315 may be false or 0 or unasserted when either dilated edge signal 408 or neutral pixel signal 409 are false or 0 or unasserted. With reference to FIG. 3, neutral edge tag signal 315 may be provided to color to key color conversion module 303 and selection logic 323 as discussed herein. Also as discussed, in some embodiments, neutral edge tag signal 315 may be used to suppress one or more color channels of scanned input image 313.

Returning briefly to FIG. 3, as discussed, color to key color conversion module 303 may, based on neutral edge tag signal 315, generate color converted image 320 (represented as C', M', Y', K'). Color to key color conversion module may generate color converted image 320 (represented as C', M', Y', K'), including suppressing one or more color channels based on neutral edge tag signal 315 and performing a gray to key color conversion based on neutral edge tag signal 315, using any suitable technique or techniques.

FIG. 5 is a block diagram illustrating an example color to key color conversion module 303, arranged in accordance with at least some implementations of the present disclosure. As shown in FIG. 5, in some examples, color to key color conversion module 303 may include a multiplexer (mux) 502 and a gray to key color (K) look up table (LUT) 501. As shown, gray to key color look up table 501 may receive a brightness channel, L*, of scanned input image 313. Gray to key color look up table 501 may provide a gray to key color non-linear transformation to match luminance-to-toner or luminance-to-inkdrop output response. For example, gray to key color look up table 501 may implement a 256×8-bit LUT to provide the non-linear transformation and to generate a key color from look up table ($K_{LUT}$) value 505.

Also as shown, multiplexer 502 may receive neutral edge tag signal 315, converted input image 314 (e.g., all color channels of converted input image 314), and key color from look up table value 505. Multiplexer 502 may also receive or implement zero values 504. For example, under control of neutral edge tag signal 315, multiplexer 502 may provide color converted image 320 (represented as C', M', Y', K') based on implementation table 503. For example, if neutral edge tag signal 315 is false or 0 or unasserted, multiplexer 502 may implement input A values (e.g., channels C, M, Y, K of converted input image 314) to generate color converted image 320. If neutral edge tag signal 315 is true or 1 or asserted, multiplexer 502 may implement input B values (e.g., 0 values for channels C, M, Y and key color from look up table value 505 for channel K). For example, when neutral edge tag signal 315 is asserted, CMY color channels may be suppressed and, in this example, suppressed to zero while the K color channel may be determined based on the gray to K conversion implemented via gray to key color look up table 501. With reference to FIG. 3, color converted image 320 may be provided to error diffusion module 304 (e.g., all channels, C', M', Y', K', of color converted image 320 may be provided to error diffusion module 304) and selection logic 323 (e.g., the key color channel, K', of color converted image 320 may be provided to selection logic 323).

Returning briefly to FIG. 3, as discussed, selection module 323 may select between an error diffusion based key color value (e.g., $K_{ED}$) or a thresholding based value (e.g., 0 for white or 1 for black based on thresholding the key color channel of color converted image 316, K') to generate the key color channel of output image 322 (e.g., $K_{out}$) based on neutral edge tag signal 315. In some examples, when neutral edge tag signal 315 is asserted, selection module 323 may select the thresholding based key color value and, when neutral edge tag signal 315 is not asserted, selection module 323 may select the error diffusion based key color value. In other examples, selection module 323 may select the thresholding based key color value only when neutral edge tag signal 315 is asserted and maximum filter value 319 meets or exceeds a threshold (e.g., threshold 318).

FIG. 6 is a block diagram illustrating example selection logic 323, arranged in accordance with at least some implementations of the present disclosure. As shown in FIG. 6 and as illustrated in FIG. 3, selection logic 323, in some examples, may include max filter 305, comparators 306, 307, AND gates 308, 310, 311, NOT gate 309, and OR gate 313, which may operate as discussed with respect to FIG. 3. For example, selection logic 323 may receive the key color channel of color converted image 316, neutral edge tag signal 315, and the key color channel of error diffusion image 321 (e.g., $K_{ED}$). Furthermore, selection logic 323 may receive or implement threshold 317 and threshold 318. As shown and as discussed with respect to FIG. 3, selection logic 323 may generate the key color channel of output image 322 (e.g., $K_{out}$).

As shown, max filter 305 may receive the key color channel of color converted image 316 (e.g., K') and may provide maximum filter value ($K'_{max}$) 319. Such processing may enhance the incoming key color channel of color converted image 316 by extending or dilating the brightness surrounding a pixel within a kernel region (e.g., a 3×3 window or the like). For example, maximum filter value ($K'_{max}$) 319 may become a new pixel value or a new pixel at the center of the window. Such processing may effectively fill in regions around high-gradient edges with the highest pixel value within the subject pixel's kernel window to assist with smoothing jagged edges that may otherwise be generated.

Furthermore, selection logic 323 may provide thresholding via threshold 317 and threshold 318. Threshold 317 may be compared to the key color channel of color converted image 316 (e.g., K') to generate a logic signal as discussed herein. For example, the logic signal from comparator 306 may be asserted whenever K' is greater than TH1. For example, threshold 317 (TH1) may be described as a threshold for a key color channel value. Furthermore, threshold 317 may be any suitable value such as 96, as shown in FIG. 6. As shown, threshold 318 (TH2) may be compared to maximum filter value 319 (e.g., $K'_{max}$) to generate a logic signal as discussed herein. For example, the logic signal from comparator 307 may be asserted whenever $K'_{max}$ is greater than TH2. For example, threshold 318 (TH2) may be described as a threshold for a maximum filter value. Furthermore, threshold 318 may be any suitable value such as 130, as shown in FIG. 6. In some examples, one or both of threshold 317 and threshold 318 may be programmable based on the properties of the scanner used to generate the scanned input image and the Lab to CMYK (or other color space) color tables (e.g., output response).

Figure 9:
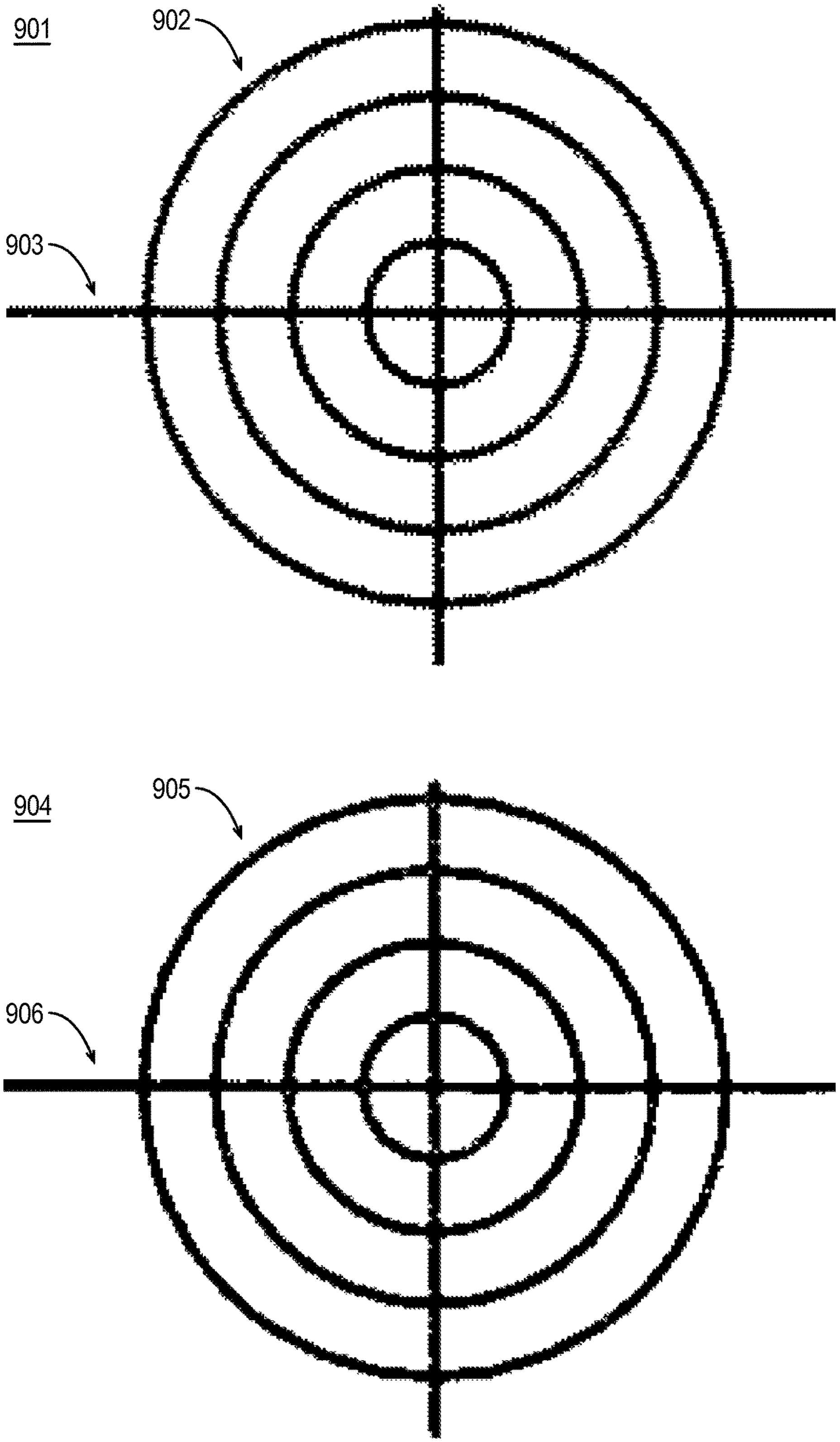
FIG. 9 illustrates example print images.
Figure 10:
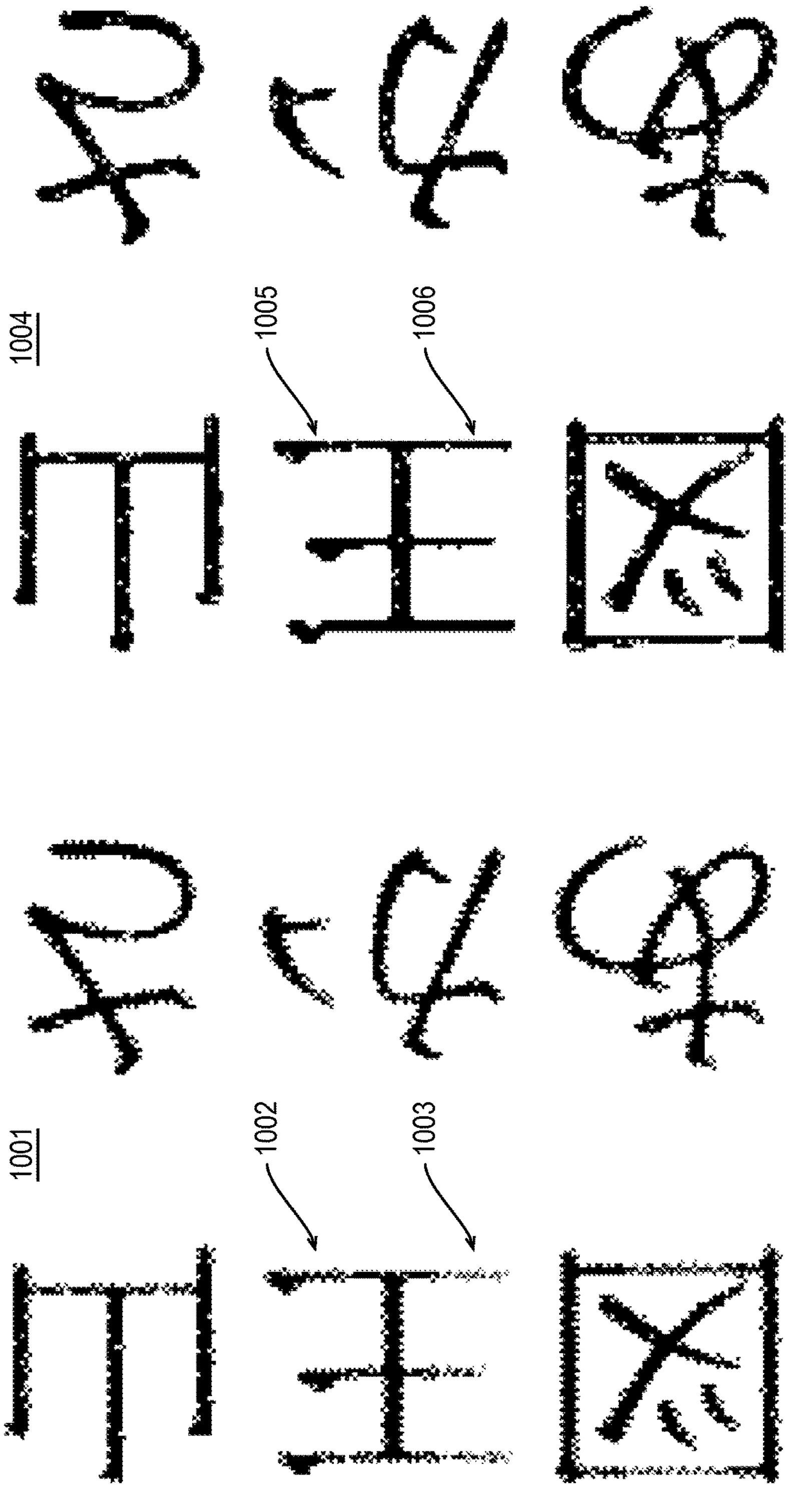
FIG. 10 illustrates example print images.

The logic signals from comparator 306, comparator 307, and neutral edge tag signal 315 may all be subject to AND operations such that only pixels with high-gradient, neutral characteristics are processed via thresholding. Furthermore, selection logic 323 may fill in 1 bpp white K pixels around the periphery of texts and lines (e.g., via max filter 305 and subsequent logic) to improve image quality by reducing jagged edges, as is shown in FIGS. 9 and 10. Furthermore, selection logic 323 may provide an error diffusion signal $K_{ED}$ outside of areas determined to be non-edge or non-neutral (e.g., based on unasserted neutral edge tag signal 315 and via NOT gate 309 and AND gate 311). Such pixel segmentation techniques provide high output image quality via error diffused CMYK 1 bpp output segments (e.g., via $C_{ED}$, $M_{ED}$, $Y_{ED}$, $K_{ED}$) for photographs, graphic regions, or the like of mixed content scanned images as well as providing sharper neutral edges for segments of text, line drawings, or the like (e.g., via suppression of color channels C, M, Y and thresholding of key or black channel K).

As discussed, selection logic 323 may provide or apply a thresholding to a key color channel of a scanned input image. For example, selection logic 323 may provide such thresholding for one or more segments of a scanned input image. The thresholding may be provided in edge areas or regions of a scanned input image for example. Such thresholding may be provided in such areas or regions in contrast to error diffusion provided in other areas or regions of the scanned input image being rendered. For example, selection logic may provide such thresholding and select between thresholded results and error diffusion results for areas, regions, or segments of a scanned input image to provide an output image such as a print ready output image.

As discussed, in some examples, output image 322 may be a 1 bpp print ready output image. In other examples, output image 322 may be a 2 bpp (or more) output image having any number of selectable values at each pixel location. In such examples, error diffusion module 304 may generate error diffusion image 321 based on a value selection for each pixel based on the selectable values. Furthermore, under the control of neutral edge tag signal 315, color to key color conversion module 303 may suppress color channels (e.g., C, M, Y channels) fully (e.g., to zero) or to another value such as one level less than the input level or the like. Also, in such contexts, selection module 323 may provide $K_{out}$ as $K_{ED}$ as discussed (e.g., when neutral edge tag signal 315 is not asserted or when neutral edge tag signal 315 is not asserted or a maximum window value threshold is not met), but may provide $K_{out}$ when the neutral edge tag signal 315 is asserted or when both neutral edge tag signal 315 is asserted and a maximum window value threshold is met not based on a binary selection but instead using one of the selectable values. For example, multiple thresholds may be implemented to determine the selectable value or the selectable value may be incremented or decremented based on a single threshold (e.g., threshold 317). In other examples, even if multiple selectable values are available, selection logic may make a binary choice between the minimum value (e.g., 0) and the maximum value (e.g., 3 in 2 bpp examples).

Figure 7:
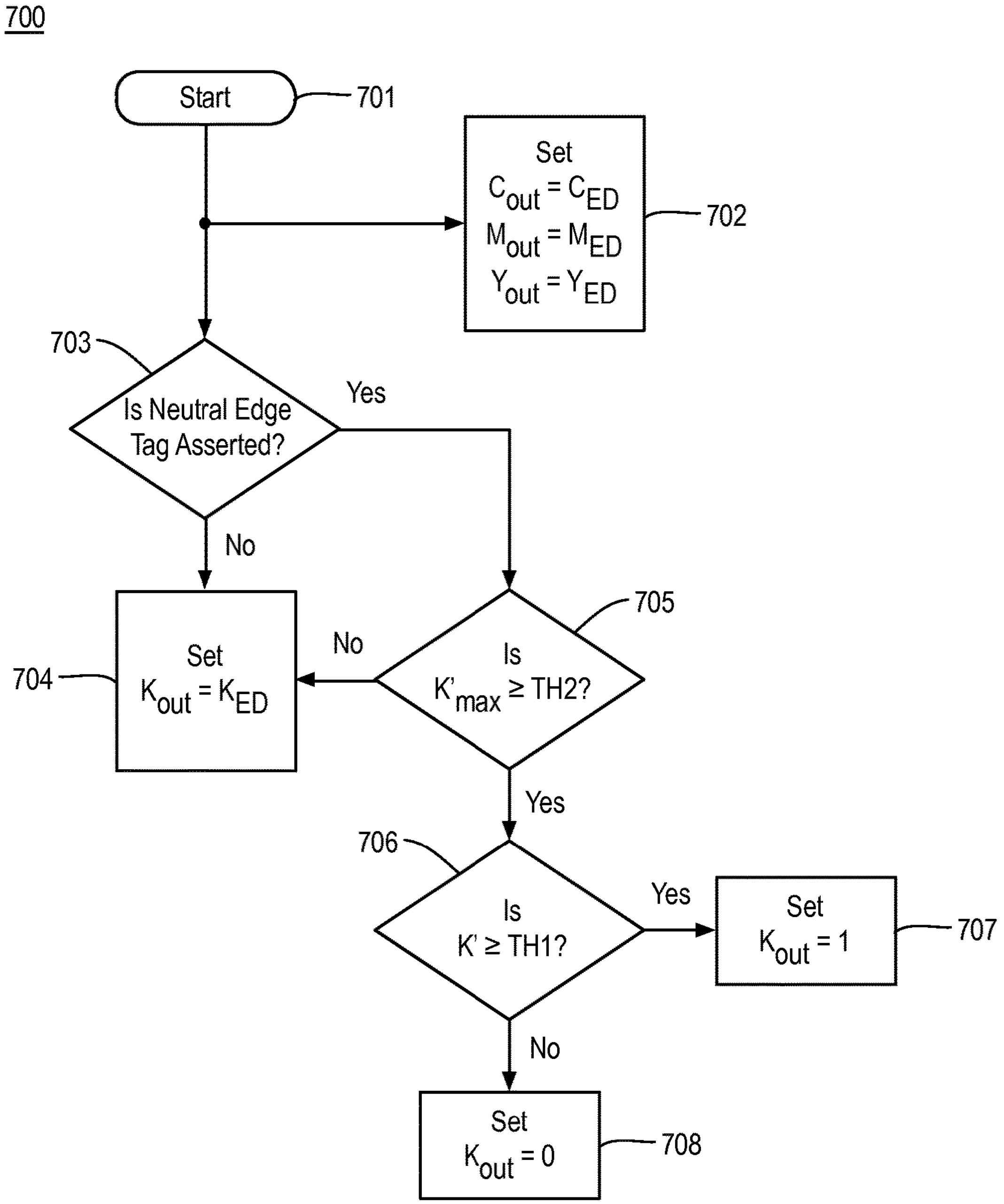
FIG. 7 illustrates an example process for rendering a scanned input image.

FIG. 7 illustrates an example process 700 for rendering a scanned input image, arranged in accordance with at least some implementations of the present disclosure. Process 700 may include one or more operations 701-708 as illustrated in FIG. 7. Process 700 may be performed by a device (e.g., device 300 as discussed herein) to render a scanned input image. For example, process 700 may be performed at a pixel block level for a scanned input image to render the image such that one or more segments of the input mage are rendered based on error diffusion and one or more other segments are rendered based on thresholding and/or selection as discussed herein. Process 700 may be repeated for any number of pixels of a scanned input image. In some examples, process 700 may be performed by device 300 for all pixels of a scanned input image to generate an output image such as a print ready output image.

As shown, process 700 may begin from start operation 701 at operation 702 and decision operation 703. At operation 702, "Set $C_{out}=C_{ED}$, $M_{out}=M_{ED}$, $Y_{out}=Y_{ED}$", color channels of an output image may be generated based on error diffusion techniques as discussed herein. Furthermore, as discussed with respect to FIG. 3, prior to error diffusion processing, the color output image channels may be suppressed based on a neutral edge tag signal (e.g., vial color to key color conversion module 303) such that inputs to error diffusion processing are suppressed prior to error diffusion processing when the neutral edge tag signal is asserted. Such color channels may be suppressed using any suitable technique or techniques such as reducing the values by a fractional multiplier or suppressing the color channels to zero or the like. Furthermore, the error diffusion processing to generate $C_{ED}$, $M_{ED}$, $Y_{ED}$ may include any suitable error diffusion processing as discussed herein.

At decision operation 703, "Is Neutral Edge Tag Asserted?", a determination may be made as to whether a neutral edge tag is asserted for the subject pixel. The neutral edge tag may include any indicator, signal, or the like indicating an edge has been detected for the subject pixel and the neutral edge tag may be generated using any suitable technique or techniques such as those discussed with respect to neutral edge tag generation module 302 and elsewhere herein. For example, the neutral edge tag may be generated based on an edge detection and neutral pixel detection for the subject pixel of the scanned input image.

If a neutral edge tag is determined to not be asserted at decision operation 703, processing may continue at operation 704, "Set $K_{out}=K_{ED}$", where a key or black channel of the output image may be set, generated, or selected based on an error diffusion technique as discussed herein. For example, selection logic 323 may select an error diffusion based key or black channel value for the subject pixel based on the neutral edge tag not being asserted for the subject pixel. For example, the neutral edge tag not being asserted may indicate the subject pixel is within a segment, microsegment, or the like of the scanned input image that is not a part of a neutral edge. As discussed, in such segments, error diffusion may provide suitable results in the rendered output image.

If a neutral edge tag is determined to be asserted at decision operation 703, processing may continue at decision operation 705, "Is $K'_{max}\geq TH2$", where a determination may be made as to whether a maximum filter value for the subject pixel is greater than or equal to a threshold. For example, the maximum filter value may be a maximum pixel value for a group of pixels in a window around and including the subject pixel (e.g., such as a 3×3 window around the subject pixel). Although discussed herein with respect to a greater than or equal to comparison, any suitable comparison between the maximum filter value and the threshold (e.g., greater than or the like) may be made such that a determination is made as to whether the subject pixel is within a window or neighborhood of a neutral edge.

If the maximum filter value is determined to be less than the threshold or the like (e.g., the subject pixel is determined to be within an window of a neutral edge) at decision operation 705, processing may continue at operation 704, where, as discussed, a key or black channel of the output image may be set, generated, or selected based on an error diffusion technique as discussed herein. For example, selection logic 323 may select an error diffusion based key or black channel value for the subject pixel based on the determination made at decision operation 705.

If the maximum filter value is determined to be greater than the threshold or the like at decision operation 705, process 700 may continue at decision operation 706, "Is $K'\geq TH1$", where a determination may be made as to whether a key or black channel value for the subject pixel is greater than or equal to a threshold. Although discussed herein with respect to a greater than or equal to comparison, any suitable comparison between the maximum filter value and the threshold (e.g., greater than or the like) may be made such that a determination is made as to whether the subject pixel is to be assigned a value of black or white in a print ready binary output image.

If the key or black channel value for the subject pixel is determined to be less than the threshold or the like (e.g., the subject pixel is thresholded to a white value), process 700 may continue at operation 708, "Set $K_{out}=0$", where a key or black channel value for the subject pixel in an output image may be set to 0 or white or the like. If the key or black channel value for the subject pixel is determined to be greater than or equal to the threshold or the like (e.g., the subject pixel is thresholded to a black value), process 700 may continue at operation 707, "Set $K_{out}=1$", where a key or black channel value for the subject pixel in an output image may be set to 1 or black or the like.

The operations of process 700 may be repeated any number of times either in series or in parallel for any number pixels of an input image, any number of segments of an input image, or any number of input images or the like.

Figure 8:
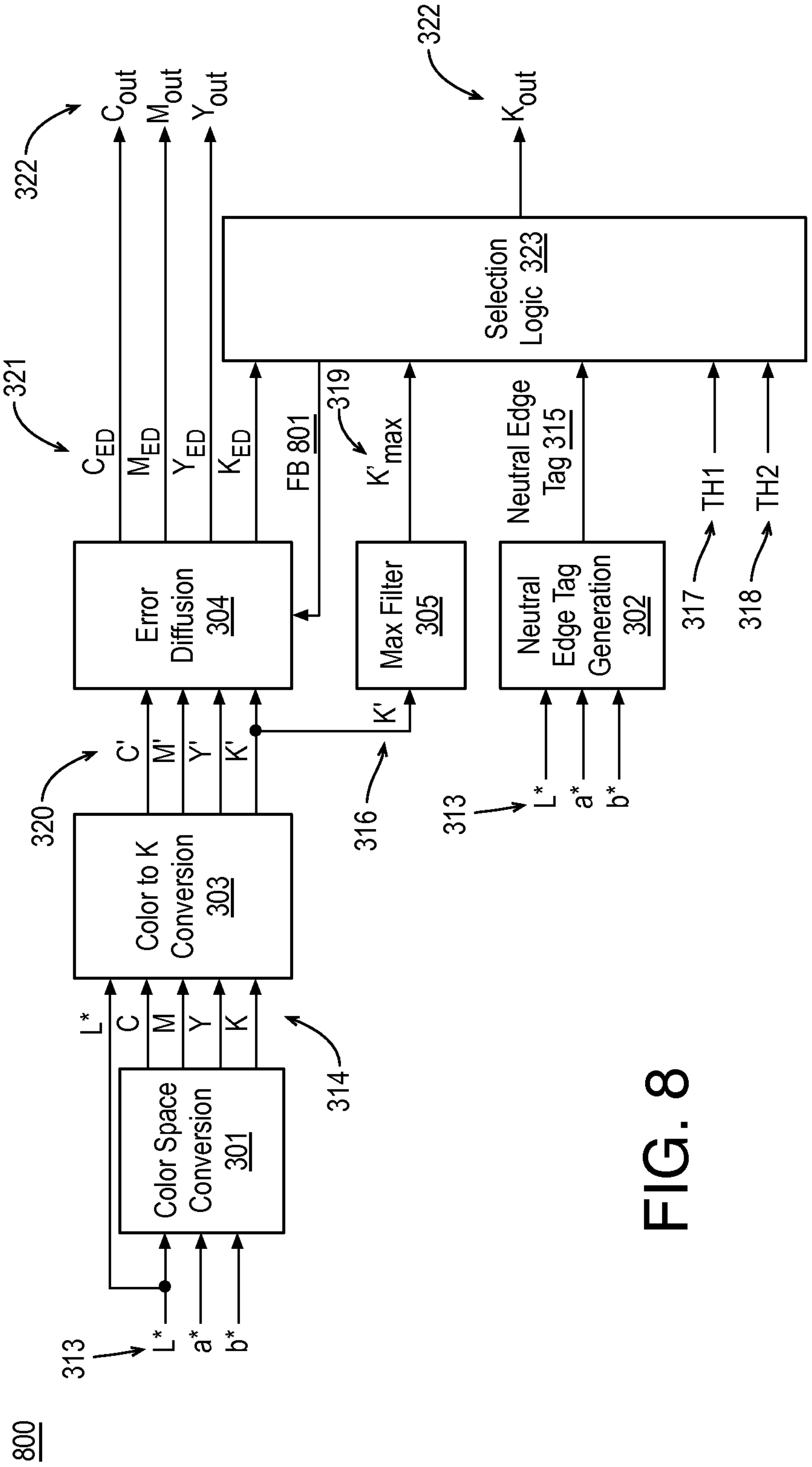
FIG. 8 illustrates an example signal legend flow chart.

FIG. 8 illustrates an example signal legend flow chart 800, arranged in accordance with at least some implementations of the present disclosure. As shown, signal legend flow chart 800 may include color space conversion module 301 (which may, in some examples, include an Lab to CMYK conversion module), color to key color conversion module 303, error diffusion module 304, max filter module 305 (which may, in some examples, include a 3×3 max filter), neutral edge tag generation module 302, and selection logic 323.

As shown, color space conversion module 301 may receive all channels of scanned input image 313 (e.g., L*, a*, and b* channels) and color space conversion module 301 may provide converted input image 314 (e.g., C, M, Y, K channels of a converted input image). Color to key color conversion module 303 may receive the brightness channel of scanned input image 313 (e.g., the L* channel) and all channels of converted input image 314 (e.g., C, M, Y, K channels), and color to key color conversion module 303 may provide color converted image 320 (e.g., C, M, Y, K channels of a color converted image represented as C', M', Y', K'). Error diffusion module 304 may receive all channels of color converted image 320 (e.g., C', M', Y', K' channels) and error diffusion module 304 may generate error diffusion image 321 (e.g., C, M, Y, K channels of an error diffusion image 321 represented as $C_{ED}$, $M_{ED}$, $Y_{ED}$, and $K_{ED}$).

Also as shown, max filter 305 may the key color channel of color converted image 316 (e.g., K') and max filter 305 may provide maximum filter value ($K'_{max}$) 319. Furthermore, neutral edge tag generation module 302 may receive all channels of scanned input image 313 (e.g., L*, a*, and b* channels) and neutral edge tag generation module 302 may generate neutral edge tag signal 315. Selection logic 323 may receive the key or black color channel of error diffusion image 321 (e.g., and $K_{ED}$), maximum filter value 319 (e.g., $K'_{max}$), neutral edge tag signal 315, threshold 317 (e.g., a pixel value threshold, TH1), and threshold 318 (e.g., a maximum pixel window value threshold, TH2), and selection logic 323 may provide the key or black color channel of output image 322 (e.g., $K_{out}$).

As discussed, the modules and/or operations discussed herein may provide for applying error diffusion to color channels of a segment of a scanned input image to generate and error diffusion rendered segments of an output image and for applying thresholding to at least one color channel (e.g., a key or black color channel) of another segment of the scanned input image based on a neutral edge tag signal being asserted to generate an neutral edge enhanced segment of the output image. Furthermore, the modules and/or operations discussed herein may provide for suppression of other color channels (e.g., cyan, magenta, and yellow color channels) based on the neutral edge tag signal being asserted.

In some examples, selection logic 323 may, for example, determine the key or black color channel of output image 322 (e.g., $K_{out}$) as discussed herein such that error diffusion module 304 provides error diffusion image 321 (e.g., $C_{ED}$, $M_{ED}$, $Y_{ED}$, and $K_{ED}$) without regard to the selections and/or threshold operations performed by selection logic 323. In other examples, selection logic 323 may provide a feedback signal 801 to error diffusion module 304. Feedback signal 801 may include any signal or indicators or the like indicating whether selection logic 323 is selecting $K_{ED}$ or not. If selection logic 323 is not selecting $K_{ED}$, feedback signal 801 may also optionally include an indication of the selection being made.

Feedback signal 801 may be used by error diffusion module 304 in applying error diffusion, for example. Feedback signal 801 may be used based on any suitable technique or techniques to modify the application of error diffusion. For example, if feedback signal 801 indicates $K_{ED}$ is selected for a pixel, error diffusion module 304 may apply error diffusion without change. In some examples, if feedback signal 801 indicates $K_{ED}$ is not selected for a pixel, error diffusion module 304 may modify error diffusion by, for example, suppressing or eliminating error propagation from that pixel. For example, if an error value is determined for a pixel, if no change is made (e.g., based on feedback signal 801 indicating $K_{ED}$ is being used for the pixel), the error value may be propagated to adjacent pixels as discussed herein. However, if feedback signal 801 indicates $K_{ED}$ is not being used for a pixel, the error value may be reduced prior to propagation (e.g., suppressed by half or any other factor) or not propagated at all (e.g., eliminated). Such processing may provide sharper edge lines along neutral edges as discussed herein. As discussed, in some examples, feedback signal 801 may be used for such processing via error diffusion module 304. In other examples, neutral edge tag signal 315 may be provided to error diffusion module 304 to effectuate such processing.

As discussed, the described techniques may improve the sharpness of black text, graphics, line-art, and the like by selectively dilating edges contained within a scanned input image using a combination of filtering, edge detection, neutral pixel detection, and thresholding techniques thereby reducing the jaggedness and color fringing to generate improved print ready bitmaps.

FIG. 9 illustrates example print images, arranged in accordance with at least some implementations of the present disclosure. For example, FIG. 9 illustrates an example print image 901 generated using only error diffusion and an example print image 904 generated using the neutral edge tag techniques discussed herein. As shown in FIG. 9, print image 901 includes jagged edges 902, 903 whereas print image 904 includes smooth edges 905, 906. Such smooth edges 905, 906 may be generated as discussed herein via generation and assertion of a neutral edge tag signal.

FIG. 10 illustrates example print images, arranged in accordance with at least some implementations of the present disclosure. For example, FIG. 10 illustrates an example print image 1001 generated using only error diffusion and an example print image 1004 generated using the neutral edge tag techniques discussed herein. As shown in FIG. 10, print image 1001 includes jagged edges 1002 whereas print image 1004 includes smooth edges 1005. Furthermore, print image 1001 includes undesirable color regions 1003 (e.g., such undesirable color regions appear as gray in the image FIG. 10) whereas print image 1004, while including sporadic undesirable color regions, includes suitable black regions 1006. For example, FIG. 10 illustrates example print images 1001, 1004 of Kanji text where neutral edge tag signal based image rendering may improve black edge and color processing via micro-segmentation as discussed herein for scanned edge profiles such as scanned edge profile 103 (please refer to FIG. 1) or the like. Such smooth edges 1005 may be generated as discussed herein via thresholding and not propagating error for pixels based on a neutral edge tag signal and such suitable black regions such as suitable black regions 1006 may be generated by suppressing color based on the neutral edge tag signal.

Figure 11:
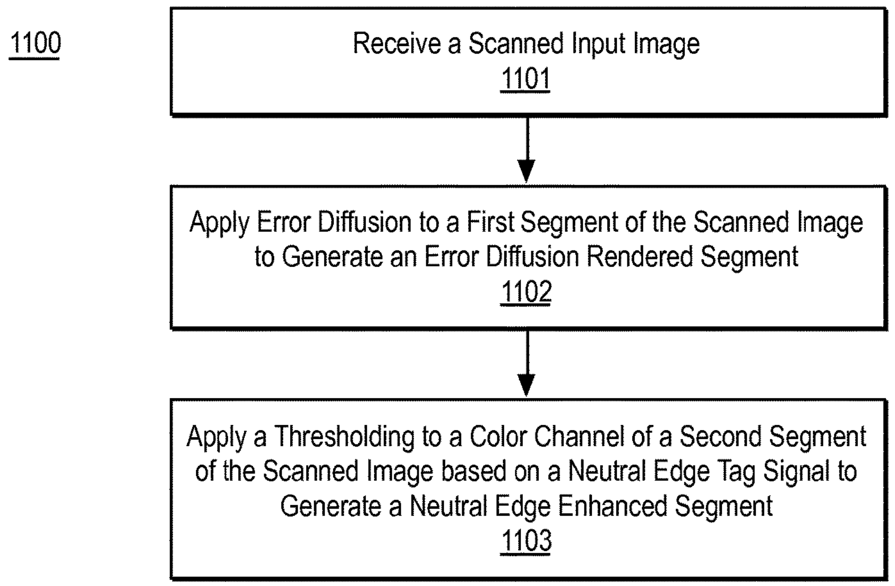
FIG. 11 is a flow diagram illustrating an example process for rendering a scanned image.

FIG. 11 is a flow diagram illustrating an example process 1100 for rendering a scanned image, arranged in accordance with at least some implementations of the present disclosure. Process 1100 may include one or more operations 1101-1103 as illustrated in FIG. 11. Process 1100 may form at least part of a motion estimation process. By way of non-limiting example, process 1100 may form at least part of a motion estimation process performed by device 300 as discussed herein. Furthermore, process 1100 will be described herein with reference to system 1200 of FIG. 12.

Figure 12:
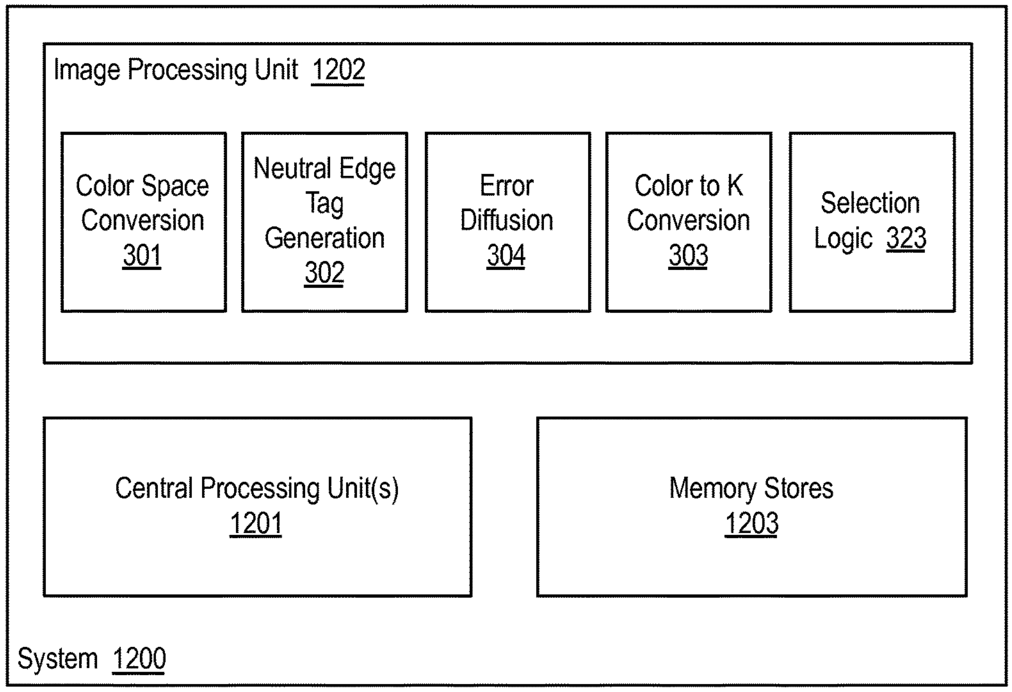
FIG. 12 is an illustrative diagram of an example system for rendering a scanned image.

FIG. 12 is an illustrative diagram of an example system 1200 for rendering a scanned image, arranged in accordance with at least some implementations of the present disclosure. As shown in FIG. 12, system 1200 may include one or more central processing units (CPU) 1201, an image processing unit 1202, and memory stores 1203. Also as shown, image processing unit 1202 may include color space conversion module 301, neutral edge tag generation module 302, error diffusion module 304, color to key color conversion module 303, and selection logic 323. Such modules may be implemented to perform operations as discussed herein. In the example of system 1200, memory stores 1203 may store image data or other associated data such as scanned input images, output images, converted input images, color converted images, error diffusion images, thresholds, neutral edge tag data, look up tables, key color from look up table values, color conversion implementation tables, canny edge data, dilated edge data, neutral pixel data, maximum filter data, or the like.

As shown, in some examples, color space conversion module 301, neutral edge tag generation module 302, error diffusion module 304, color to key color conversion module 303, and selection logic 323 may be implemented via image processing unit 1202. In other examples, one or more or portions of color space conversion module 301, neutral edge tag generation module 302, error diffusion module 304, color to key color conversion module 303, and selection logic 323 may be implemented via central processing units 1201 or a graphics processing unit. In yet other examples, one or more or portions of color space conversion module 301, neutral edge tag generation module 302, error diffusion module 304, color to key color conversion module 303, and selection logic 323 may be implemented via an imaging processing pipeline or unit.

Image processing unit 1202 may include any number and type of graphics or image processing units that may provide the operations as discussed herein. Such operations may be implemented via software or hardware or a combination thereof. For example, image processing unit 1202 may include circuitry dedicated to manipulate image data obtained from memory stores 1203 (e.g., scanned input images). Central processing units 1201 may include any number and type of processing units or modules that may provide control and other high level functions for system 1200 and/or provide any operations as discussed herein. Memory stores 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1203 may be implemented by cache memory. In an embodiment, one or more or portions of color space conversion module 301, neutral edge tag generation module 302, error diffusion module 304, color to key color conversion module 303, and selection logic 323 may be implemented via an execution unit (EU) of image processing unit 1202. The EU may include, for example, programmable logic or circuitry such as a logic core or cores that may provide a wide array of programmable logic functions. In an embodiment, one or more or portions of color space conversion module 301, neutral edge tag generation module 302, error diffusion module 304, color to key color conversion module 303, and selection logic 323 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of color space conversion module 301, neutral edge tag generation module 302, error diffusion module 304, color to key color conversion module 303, and selection logic 323 may be implemented via an application specific integrated circuit (ASIC). The ASIC may include an integrated circuitry customized to perform the operations discussed herein.

Returning to discussion of FIG. 11, process 1100 may begin at operation 1101, "Receive a Scanned Input Image", where a scanned input image including multiple color channels may be received. For example, memory stores 1203 of system 1200 may receive a scanned input image such as scanned input image 313 and/or converted input image 314 or the like. In some examples, an image, raw image data, or image data, or the like may be processed to generate all or portions of the scanned input image. For example, RGB data may be converted to generate Lab and/or CMYK color space scanned input image data. The multiple color channels may include any suitable color channels such as RGB color channels, YCbCr color channels, Lab color channels, CMYK color channels, or a combination thereof.

Processing may continue at operation 1102, "Apply Error Diffusion to a First Segment of the Scanned Image to Generate an Error Diffusion Rendered Segment", where error diffusion may be applied to at least one color channel of the plurality of color channels for a first segment of the scanned input image to generate an error diffusion rendered segment of an output image. For example, error diffusion may be applied via error diffusion module 304 as implemented via image processing unit 1202. In some examples, the at least one color channel may be a key or black color channel. Applying error diffusion may include any suitable technique or techniques such as determining an output color channel value and propagating any error associated with the output color channel value to adjacent pixels. In some examples, applying the error diffusion may be based in part on a feedback signal received via selection logic 323. For example, the feedback signal may include information as to whether an error diffusion value was selected for a pixel based on thresholding and applying the feedback signal may include suppressing error propagation when the feedback signal indicates error diffusion is not used for the pixel of the scanned input image.

Processing may continue at operation 1103, "Apply a Thresholding to a Color Channel of a Second Segment of the Scanned Image based on a Neutral Edge Tag Signal to Generate a Neutral Edge Enhanced Segment", where a thresholding may be applied to the color channel for a second segment of the scanned input image based on a neutral edge tag signal to generate a neutral edge enhanced segment of the output image. For example, the thresholding may be applied via selection logic 323 as implemented via image processing unit 1202. As discussed with respect to operation 1102, the color channel may, in some examples, be a key or black color channel. For example, applying the thresholding may be based on, for a pixel of the scanned input image, a comparison of a pixel value of the color channel to a first threshold and a comparison of a maximum value in a pixel window around the pixel to a second threshold. For example, selection logic 323 may apply a comparator to compare the pixel value of the color channel to a pixel value threshold and another comparator to compare a maximum value in a pixel window around the pixel to a maximum pixel window threshold. In some examples, the neutral edge enhanced segment of the output image includes, for the pixel, a value associated with black when the pixel value and the maximum value exceed the first and second thresholds, respectively, and a value associated with white when the maximum value exceeds the second threshold and the pixel value does not exceed the first threshold.

The neutral edge tag signal may be generated using any suitable technique or techniques. For example, the neutral edge tag signal may be generated by applying edge detection to a luminance channel of the scanned input image, applying a neutral pixel detector to one or more color channels of the plurality of color channels, and indicating an edge tag for a pixel of the scanned input image when an edge and a neutral pixel are detected for the pixel. For example, neutral edge tag generation module 302 as implemented via image processing unit 1202 may apply edge detection to the luminance channel (e.g., via a canny edge detector applied to an L* channel), apply a neutral pixel detector to the color channels (e.g., a* and B* color channels), and indicate an edge when an edge and a neutral pixel are detected (e.g., via a logical AND operation). In some examples, applying edge detection may also include applying a dilation to an edge detection signal of the luminance channel (e.g., via a dilation module of neutral edge tag generation module 302). In some examples, applying the neutral pixel detector may include summing two or more color channels of the plurality of color channels and comparing the sum to a threshold (e.g., summing the a* and b* color channels and comparing the sum to neutral pixel threshold).

In some examples, process 1100 may also include suppressing one or more color channels based on the neutral edge tag signal. For example, the color channels may be suppressed via color to key color conversion module 303 as implemented via image processing unit 1202. In some examples, the suppressed color channel(s) may include one or more of a cyan, magenta, or yellow color channel of the scanned input image. For example, suppressing the one or more color channels may include setting a channel pixel value of the color channel to zero for a pixel when the neutral edge tag signal indicates an edge tag for the pixel. In other examples, suppressing the one or more color channels may include reducing a channel pixel value of the color channel when the neutral edge tag signal indicates an edge tag for the pixel. Furthermore, process 1100 may selectively apply a gray to key color transform based on the neutral edge tag signal to generate the key or black color channel. For example, such processing may be performed via a gray to key color look up table of color to key color conversion module 303 as implemented via image processing unit 1202.

Such a process may generate an output image having one or more segments rendered based on error diffusion and one or more segments rendered based on thresholding. The output image may include any suitable image format such as a print ready binary image. As discussed, the segments may be any size or shape and may be generated based on the assertion of a neutral edge tag signal.

Process 1100 may be repeated any number of times either in series or in parallel for any number of input images or portions of input images. Process 1100 may provide for high quality print or image quality for mixed content documents. For example, process 1100 may provide for high quality neutral edges in text, line drawings, and the like contained within a mixed content document.

Various components of the systems described herein may be implemented in software, firmware, and/or hardware and/or any combination thereof. For example, various components of device 300, system 1200, system 1300, or device 1400 may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as scanners (e.g., to perform optical scanning to generate scanned input images), printers (e.g., to translate an output image to paper or similar physical media), image pre-processing circuitry, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 300, system 1200, system 1300, or device 1400, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
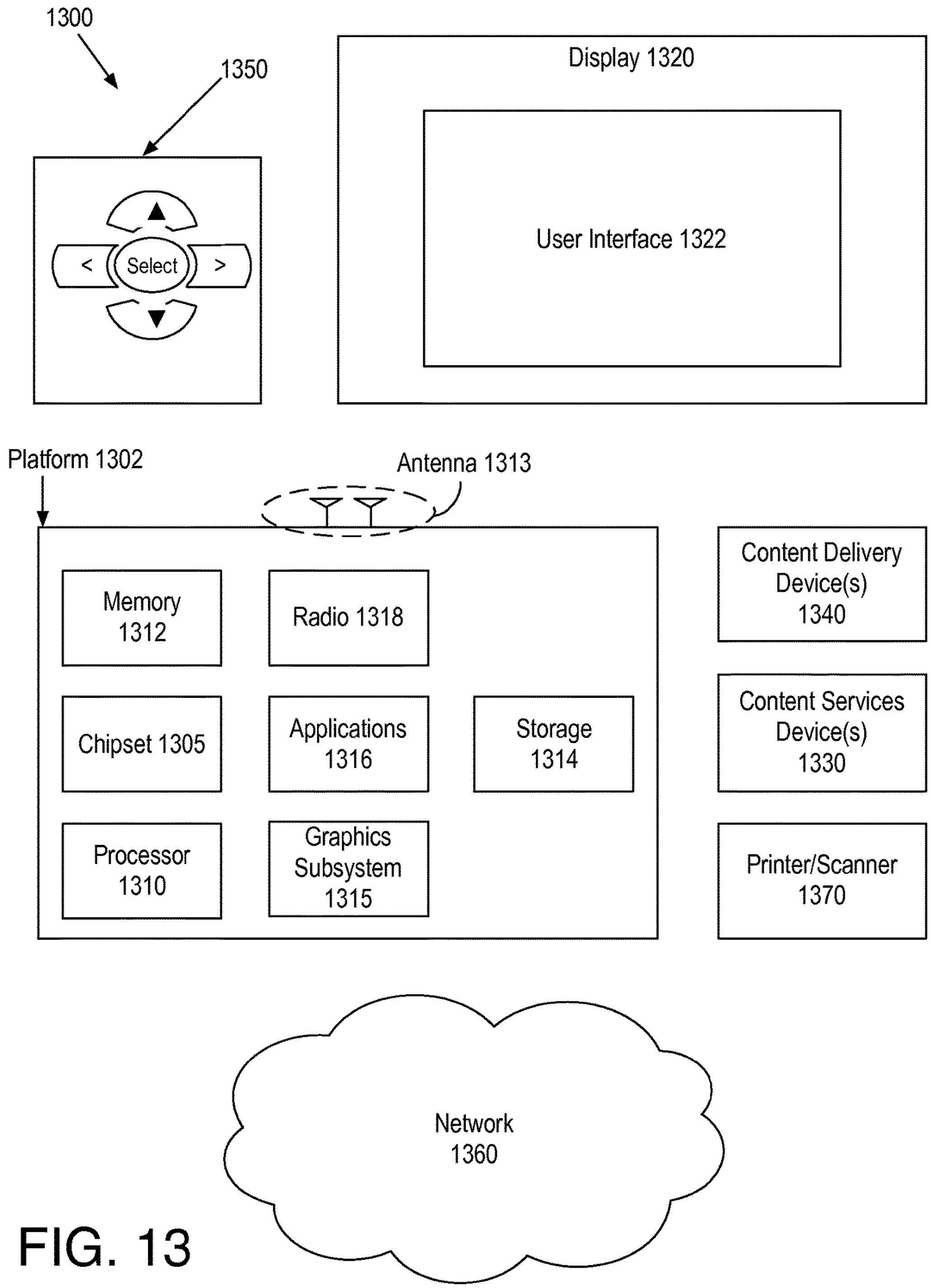
FIG. 13 is an illustrative diagram of an example system.

FIG. 13 is an illustrative diagram of an example system 1300, arranged in accordance with at least some implementations of the present disclosure. In various implementations, system 1300 may be a computing system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, scanner, printer, multi-function device, and so forth.

In various implementations, system 1300 includes a platform 1302 coupled to a display 1320. Platform 1302 may receive content from a content device such as content services device(s) 1330 or content delivery device(s) 1340 or other similar content sources such as a printer/scanner 1370. For example, platform 1302 may receive a scanned image from printer/scanner 1370. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU), a visual processing unit (VPU), or an image processing unit, for example. In some examples, graphics subsystem 1315 may perform scanned image rendering as discussed herein. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multicore processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any flat panel monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

Printer/scanner 1370 may include any suitable peripheral device that may provide print and/or scan functionality. For example, printer/scanner 1370 may include a color inkjet or laser printer. In some examples, printer/scanner 1370 may include a flatbed or drum scanner or the like. In an example, printer/scanner 1370 may be implemented as a multi-function scan, print, fax device, or the like.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
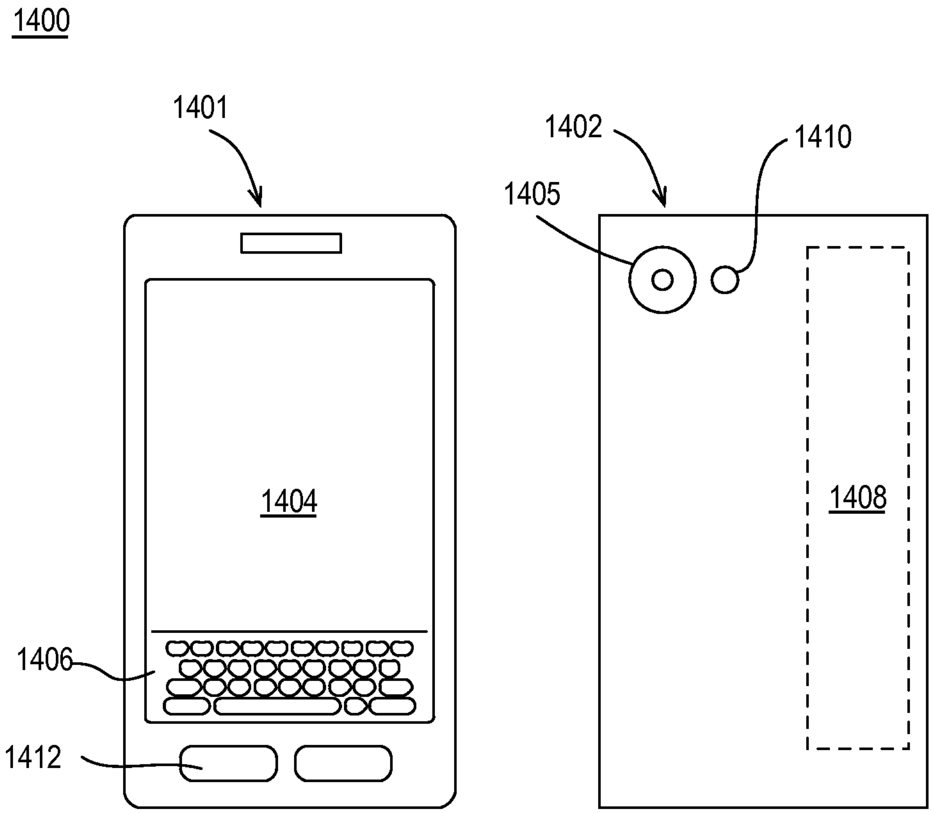
FIG. 14 illustrates an example small form factor device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, device 300, system 1200, or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for rendering a scanned image comprises receiving a scanned input image comprising a plurality of color channels, applying error diffusion to at least a first color channel of the plurality of color channels for a first segment of the scanned input image to generate an error diffusion rendered segment of an output image, and applying a thresholding to at least the first color channel for a second segment of the scanned input image based on a neutral edge tag signal to generate a neutral edge enhanced segment of the output image.

Further to the first embodiments, the method further comprises suppressing a second color channel of the plurality of color channels based on the neutral edge tag signal.

Further to the first embodiments, the method further comprises suppressing a second color channel of the plurality of color channels based on the neutral edge tag signal, wherein the scanned input image comprises a CMYK color space image, the first color channel comprises a black color channel, and the second color channel comprises at least one of a cyan color channel, a magenta color channel, or a yellow color channel.

Further to the first embodiments, the method further comprises suppressing a second color channel of the plurality of color channels based on the neutral edge tag signal, wherein suppressing the second color channel comprises setting a channel pixel value of the second color channel to zero for a pixel when the neutral edge tag signal indicates an edge tag for the pixel.

Further to the first embodiments, the method further comprises selectively applying a gray to key color transform based on the neutral edge tag signal to generate the first color channel.

Further to the first embodiments, the method further comprises generating the neutral edge tag signal by applying edge detection to a luminance channel of the scanned input image, applying a neutral pixel detector to one or more color channels of the plurality of color channels, and indicating an edge tag for a pixel of the scanned input image when an edge and a neutral pixel are detected for the pixel.

Further to the first embodiments, the method further comprises generating the neutral edge tag signal by applying edge detection to a luminance channel of the scanned input image, applying a neutral pixel detector to one or more color channels of the plurality of color channels, and indicating an edge tag for a pixel of the scanned input image when an edge and a neutral pixel are detected for the pixel, wherein applying the edge detection further comprises applying a dilation to an edge detection signal of the luminance channel.

Further to the first embodiments, the method further comprises generating the neutral edge tag signal by applying edge detection to a luminance channel of the scanned input image, applying a neutral pixel detector to one or more color channels of the plurality of color channels, and indicating an edge tag for a pixel of the scanned input image when an edge and a neutral pixel are detected for the pixel, wherein applying the neutral pixel detector comprises summing two or more color channels of the plurality of color channels and comparing the sum to a threshold.

Further to the first embodiments, the method further comprises generating the neutral edge tag signal by applying edge detection to a luminance channel of the scanned input image, applying a neutral pixel detector to one or more color channels of the plurality of color channels, and indicating an edge tag for a pixel of the scanned input image when an edge and a neutral pixel are detected for the pixel, and/or wherein applying the edge detection further comprises applying a dilation to an edge detection signal of the luminance channel, and/or wherein applying the neutral pixel detector comprises summing two or more color channels of the plurality of color channels and comparing the sum to a threshold.

Further to the first embodiments, applying the thresholding is based on, for a pixel of the scanned input image, a comparison of a pixel value of the first color channel to a first threshold and a comparison of a maximum value in a pixel window around the pixel to a second threshold.

Further to the first embodiments, applying the thresholding is based on, for a pixel of the scanned input image, a comparison of a pixel value of the first color channel to a first threshold and a comparison of a maximum value in a pixel window around the pixel to a second threshold, wherein the neutral edge enhanced segment of the output image comprises, for the pixel, a value associated with black when the pixel value and the maximum value exceed the first and second thresholds, respectively.

Further to the first embodiments, applying the thresholding is based on, for a pixel of the scanned input image, a comparison of a pixel value of the first color channel to a first threshold and a comparison of a maximum value in a pixel window around the pixel to a second threshold, wherein the neutral edge enhanced segment of the output image comprises, for the pixel, a value associated with white when the maximum value exceeds the second threshold and the pixel value does not exceed the first threshold.

Further to the first embodiments, applying the thresholding is based on, for a pixel of the scanned input image, a comparison of a pixel value of the first color channel to a first threshold and a comparison of a maximum value in a pixel window around the pixel to a second threshold, and/or the neutral edge enhanced segment of the output image comprises, for the pixel, a value associated with black when the pixel value and the maximum value exceed the first and second thresholds, respectively, or a value associated with white when the maximum value exceeds the second threshold and the pixel value does not exceed the first threshold.

Further to the first embodiments, applying the error diffusion is based on a feedback signal generated based on the thresholding.

Further to the first embodiments, applying the error diffusion is based on a feedback signal generated based on the thresholding, wherein applying the error diffusion based on the feedback signal comprises suppressing error propagation when the feedback signal indicates error diffusion is not used for a pixel of the scanned input image.

Further to the first embodiments, applying the error diffusion is based on a feedback signal generated based on the thresholding, and/or wherein the applying the error diffusion based on the feedback signal comprises suppressing error propagation when the feedback signal indicates error diffusion is not used for a pixel of the scanned input image.

Further to the first embodiments, the output image comprises a print ready binary image.

Further to the first embodiments, the method further comprises color converting a first scanned input image to generate the scanned input image, wherein the first scanned input image comprises a Lab color space image and the scanned input image comprises a CMYK color space image, generating the neutral edge tag signal by applying edge detection to a luminance channel of the first scanned input image, applying a neutral pixel detector to one or more color channels of the first scanned input image, and indicating an edge tag for a pixel of the scanned input image when an edge and a neutral pixel are detected for the pixel, suppressing a second color channel of the plurality of color channels for the first segment and the second segment based on the neutral edge tag signal, and selectively applying a gray to key color transform based on the neutral edge tag signal to generate the first color channel, wherein applying the thresholding is based on, for a pixel of the scanned input image, a comparison of a pixel value of the first color channel to a first threshold and a comparison of a maximum value in a pixel window around the pixel to a second threshold, and wherein the output image comprises a CMYK color space print ready binary image.

In one or more second embodiments, a system for rendering a scanned image comprises a memory configured to receive a scanned input image comprising a plurality of color channels and an image processing unit coupled to the memory, the image processing unit comprising error diffusion logic to apply error diffusion to at least a first color channel of the plurality of color channels for a first segment of the scanned input image to generate an error diffusion rendered segment of an output image and selection logic to apply at least one threshold to at least the first color channel for a second segment of the scanned input image based on a neutral edge tag signal to generate a neutral edge enhanced segment of the output image.

Further to the second embodiments, the system further comprises color to key color conversion logic to suppress a second color channel of the plurality of color channels based on the neutral edge tag signal.

Further to the second embodiments, the system further comprises color to key color conversion logic to suppress a second color channel of the plurality of color channels based on the neutral edge tag signal, wherein the scanned input image comprises a CMYK color space image, the first color channel comprises a black color channel, and the second color channel comprises at least one of a cyan color channel, a magenta color channel, or a yellow color channel.

Further to the second embodiments, the system further comprises color to key color conversion logic to suppress a second color channel of the plurality of color channels based on the neutral edge tag signal, wherein the color to key color conversion logic to suppress the second color channel comprises the color to key color conversion logic to set a channel pixel value of the second color channel to zero for a pixel when the neutral edge tag signal indicates an edge tag for the pixel.

Further to the second embodiments, the system further comprises color to key color conversion logic to selectively apply a gray to key color transform based on the neutral edge tag signal to generate the first color channel.

Further to the second embodiments, the system further comprises neutral edge tag generation logic to apply edge detection to a luminance channel of the scanned input image, apply a neutral pixel detector to one or more color channels of the plurality of color channels, and indicate an edge tag for a pixel of the scanned input image when an edge and a neutral pixel are detected for the pixel to generate the neutral edge tag signal.

Further to the second embodiments, the system further comprises neutral edge tag generation logic to apply edge detection to a luminance channel of the scanned input image, apply a neutral pixel detector to one or more color channels of the plurality of color channels, and indicate an edge tag for a pixel of the scanned input image when an edge and a neutral pixel are detected for the pixel to generate the neutral edge tag signal, wherein the neutral edge tag generation logic to apply edge detection comprises the neutral edge tag generation logic to apply a dilation to an edge detection signal of the luminance channel.

Further to the second embodiments, the system further comprises neutral edge tag generation logic to apply edge detection to a luminance channel of the scanned input image, apply a neutral pixel detector to one or more color channels of the plurality of color channels, and indicate an edge tag for a pixel of the scanned input image when an edge and a neutral pixel are detected for the pixel to generate the neutral edge tag signal, wherein the neutral edge tag generation logic to apply the neutral pixel detector comprises the neutral edge tag generation logic to sum two or more color channels of the plurality of color channels and compare the sum to a threshold.

Further to the second embodiments, the selection logic to apply the at least one threshold comprises the selection logic to, for a pixel of the scanned input image, compare a pixel value of the first color channel to a first threshold and compare a maximum value in a pixel window around the pixel to a second threshold.

Further to the second embodiments, the selection logic to apply the at least one threshold comprises the selection logic to, for a pixel of the scanned input image, compare a pixel value of the first color channel to a first threshold and compare a maximum value in a pixel window around the pixel to a second threshold, wherein the neutral edge enhanced segment of the output image comprises, for the pixel, a value associated with black when the pixel value and the maximum value exceed the first and second thresholds, respectively.

Further to the second embodiments, the selection logic to apply the at least one threshold comprises the selection logic to, for a pixel of the scanned input image, compare a pixel value of the first color channel to a first threshold and compare a maximum value in a pixel window around the pixel to a second threshold, wherein the neutral edge enhanced segment of the output image comprises, for the pixel, a value associated with white when the maximum value exceeds the second threshold and the pixel value does not exceed the first threshold.

Further to the second embodiments, the selection logic is to generate a feedback signal, and wherein the error diffusion logic is to apply the error diffusion based on the feedback signal.

Further to the second embodiments, the system further comprises color space conversion logic to convert a first scanned input image to generate the scanned input image, wherein the first scanned input image comprises a Lab color space image and the scanned input image comprises a CMYK color space image, neutral edge tag generation logic to apply edge detection to a luminance channel of the first scanned input image, apply a neutral pixel detector to one or more color channels of the first scanned input image, and indicate an edge tag for a pixel of the scanned input image when an edge and a neutral pixel are detected for the pixel to generate the neutral edge tag signal, and color to key color conversion logic to suppress a second color channel of the plurality of color channels for the first segment and the second segment based on the neutral edge tag signal and to selectively apply a gray to key color transform based on the neutral edge tag signal to generate the first color channel, wherein the selection logic is to, for a pixel of the scanned input image, compare of a pixel value of the first color channel to the first threshold and compare a maximum value in a pixel window around the pixel to a second threshold.

In one or more third embodiments, a system for rendering a scanned image comprises means for receiving a scanned input image comprising a plurality of color channels, means for applying error diffusion to at least a first color channel of the plurality of color channels for a first segment of the scanned input image to generate an error diffusion rendered segment of an output image, and means for applying a thresholding to at least the first color channel for a second segment of the scanned input image based on a neutral edge tag signal to generate a neutral edge enhanced segment of the output image.

Further to the third embodiments, the system further comprises means for suppressing a second color channel of the plurality of color channels based on the neutral edge tag signal.

Further to the third embodiments, the system further comprises means for suppressing a second color channel of the plurality of color channels based on the neutral edge tag signal, wherein the scanned input image comprises a CMYK color space image, the first color channel comprises a black color channel, and the second color channel comprises at least one of a cyan color channel, a magenta color channel, or a yellow color channel.

Further to the third embodiments, the system further comprises means for suppressing a second color channel of the plurality of color channels based on the neutral edge tag signal, wherein suppressing the second color channel comprises setting a channel pixel value of the second color channel to zero for a pixel when the neutral edge tag signal indicates an edge tag for the pixel.

Further to the third embodiments, the system further comprises means for selectively applying a gray to key color transform based on the neutral edge tag signal to generate the first color channel.

Further to the third embodiments, the system further comprises means for generating the neutral edge tag signal by applying edge detection to a luminance channel of the scanned input image, means for applying a neutral pixel detector to one or more color channels of the plurality of color channels, and means for indicating an edge tag for a pixel of the scanned input image when an edge and a neutral pixel are detected for the pixel.

Further to the third embodiments, the system further comprises means for generating the neutral edge tag signal by applying edge detection to a luminance channel of the scanned input image, means for applying a neutral pixel detector to one or more color channels of the plurality of color channels, and means for indicating an edge tag for a pixel of the scanned input image when an edge and a neutral pixel are detected for the pixel, wherein the means for applying the edge detection further comprises means for applying a dilation to an edge detection signal of the luminance channel.

Further to the third embodiments, the system further comprises means for generating the neutral edge tag signal by applying edge detection to a luminance channel of the scanned input image, means for applying a neutral pixel detector to one or more color channels of the plurality of color channels, and means for indicating an edge tag for a pixel of the scanned input image when an edge and a neutral pixel are detected for the pixel, wherein the means for applying the neutral pixel detector comprise means for summing two or more color channels of the plurality of color channels and means for comparing the sum to a threshold.

Further to the third embodiments, the means for applying the thresholding comprise means for applying the threshold based on, for a pixel of the scanned input image, a comparison of a pixel value of the first color channel to a first threshold and a comparison of a maximum value in a pixel window around the pixel to a second threshold.

Further to the third embodiments, the means for applying the thresholding comprise means for applying the threshold based on, for a pixel of the scanned input image, a comparison of a pixel value of the first color channel to a first threshold and a comparison of a maximum value in a pixel window around the pixel to a second threshold, wherein the neutral edge enhanced segment of the output image comprises, for the pixel, a value associated with black when the pixel value and the maximum value exceed the first and second thresholds, respectively.

Further to the third embodiments, the means for applying the thresholding comprise means for applying the threshold based on, for a pixel of the scanned input image, a comparison of a pixel value of the first color channel to a first threshold and a comparison of a maximum value in a pixel window around the pixel to a second threshold, wherein the neutral edge enhanced segment of the output image comprises, for the pixel, a value associated with white when the maximum value exceeds the second threshold and the pixel value does not exceed the first threshold.

Further to the third embodiments, wherein the means for applying the error diffusion comprise means for applying the error diffusion based on a feedback signal generated based on the thresholding.

Further to the third embodiments, wherein the means for applying the error diffusion comprise means for applying the error diffusion based on a feedback signal generated based on the thresholding, wherein the means for applying the error diffusion based on the feedback signal comprise means for suppressing error propagation when the feedback signal indicates error diffusion is not used for a pixel of the scanned input image.

Further to the third embodiments, the output image comprises a print ready binary image.

In one or more fourth embodiments, at least one machine readable medium comprises a plurality of instructions that, in response to being executed on a computing device, cause the computing device to render a scanned image by receiving a scanned input image comprising a plurality of color channels, applying error diffusion to at least a first color channel of the plurality of color channels for a first segment of the scanned input image to generate an error diffusion rendered segment of an output image, and applying a thresholding to at least the first color channel for a second segment of the scanned input image based on a neutral edge tag signal to generate a neutral edge enhanced segment of the output image.

Further to the fourth embodiments, the machine readable medium comprises further instructions that, in response to being executed on a computing device, cause the computing device to render the scanned image by suppressing a second color channel of the plurality of color channels based on the neutral edge tag signal.

Further to the fourth embodiments, the machine readable medium comprises further instructions that, in response to being executed on a computing device, cause the computing device to render the scanned image by generating the neutral edge tag signal by applying edge detection to a luminance channel of the scanned input image, applying a neutral pixel detector to one or more color channels of the plurality of color channels, and indicating an edge tag for a pixel of the scanned input image when an edge and a neutral pixel are detected for the pixel.

Further to the fourth embodiments, applying the thresholding is based on, for a pixel of the scanned input image, a comparison of a pixel value of the first color channel to a first threshold and a comparison of a maximum value in a pixel window around the pixel to a second threshold.

Further to the fourth embodiments, applying the error diffusion is based on a feedback signal generated based on the thresholding and wherein the applying the error diffusion based on the feedback signal comprises suppressing error propagation when the feedback signal indicates error diffusion is not used for a pixel of the scanned input image.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for rendering a scanned image comprising:
 receiving a scanned input image comprising a plurality of color channels;
 generating a neutral edge tag signal for the scanned input image by applying edge detection to a luminance channel of the scanned input image, applying a neutral pixel detector to one or more color channels of the plurality of color channels, and indicating an asserted neutral edge tag for a pixel of the scanned input image when an edge and a neutral pixel are detected for the pixel or indicating a non-asserted neutral edge tag for the pixel when an edge or a neutral pixel are not detected for the pixel;
 providing a color space conversion of the scanned input image to generate a second plurality of color channels;
 applying error diffusion to at least a first color channel of the second plurality of color channels for a first segment of the scanned input image based on the neutral edge tag signal not being asserted to generate an error diffusion rendered segment of an output image, wherein applying the error diffusion comprises eliminating error propagation from a second pixel to a third pixel in response to a feedback signal indicating an error diffusion value for the second pixel was not selected for the second pixel in the output image; and
 applying a thresholding to at least the first color channel for a second segment of the scanned input image based on the neutral edge tag signal being asserted to generate a neutral edge enhanced segment of the output image,
 wherein applying the thresholding comprises setting a fourth pixel to a value associated with black when a maximum first color value in a window around the fourth pixel is greater than a first threshold and a first color channel value for the fourth pixel is greater than a second threshold, and setting the fourth pixel to a value associated with white when the maximum first color value is greater than the first threshold and the first color channel value for the fourth pixel is not greater than the second threshold.

2. The method of claim 1, further comprising:
 suppressing a second color channel of the second plurality of color channels based on the neutral edge tag signal by providing a value associated with white for the second color channel when the neutral edge tag signal is asserted.

3. The method of claim 2, wherein the scanned input image comprises a Lab color space image, the second color channels provide a CMYK color space image, the first color channel of the second plurality of color channels comprises a black color channel, and the second color channel of the second plurality of color channels comprises at least one of a cyan color channel, a magenta color channel, or a yellow color channel.

4. The method of claim 1, further comprising:
 selectively applying a gray to key color transform to the luminance channel of the scanned input image when the neutral edge tag signal is asserted to generate the first color channel.

5. The method of claim 1, wherein applying the edge detection further comprises applying a dilation to an edge detection signal of the luminance channel.

6. The method of claim 1, wherein applying the neutral pixel detector comprises summing two or more color channels of the plurality of color channels and indicating a neutral pixel when the sum is not greater than a threshold.

7. The method of claim 1, wherein applying the thresholding comprises comparing the maximum first color value to the first threshold and, when the maximum first color value is not greater than the first threshold, setting the fourth pixel to an error diffusion value for the fourth pixel.

8. The method of claim 1, wherein the output image comprises a print ready binary image.

9. A system for rendering a scanned image comprising:
 a memory configured to receive a scanned input image comprising a plurality of color channels; and
 an image processing unit coupled to the memory, the image processing unit comprising:
 neutral edge tag generation circuitry to apply edge detection to a luminance channel of the scanned input image, apply a neutral pixel detector to one or more color channels of the plurality of color channels, and indicate an asserted neutral edge tag for a pixel of the scanned input image when an edge and a neutral pixel are detected for the pixel or indicate a non-asserted neutral edge tag for the pixel when an edge or a neutral pixel are not detected for the pixel to generate a neutral edge tag signal;

color space conversion circuitry to provide a color space conversion of the scanned input image to generate a second plurality of color channels;

error diffusion circuitry to apply error diffusion to at least a first color channel of the second plurality of color channels for a first segment of the scanned input image based on the neutral edge tag signal not being asserted to generate an error diffusion rendered segment of an output image, wherein to apply the error diffusion, the error diffusion circuitry is to eliminate error propagation from a second pixel to a third pixel in response to a feedback signal indicating an error diffusion value for the second pixel was not selected for the second pixel in the output image; and selection circuitry to apply at least one threshold to at least the first color channel for a second segment of the scanned input image based on the neutral edge tag signal being asserted to generate a neutral edge enhanced segment of the output image, and the selection circuitry to set a fourth pixel to a value associated with black when a maximum first color value in a window around the fourth pixel is greater than a first threshold and a first color channel value for the fourth pixel is greater than a second threshold, and to set the fourth pixel to a value associated with white when the maximum first color value is greater than the first threshold and the first color channel value for the fourth pixel is not greater than the second threshold.

10. The system of claim 9, further comprising:

color to key color conversion circuitry to suppress a second color channel of the second plurality of color channels based on the neutral edge tag signal by providing a value associated with white for the second color channel when the neutral edge tag signal is asserted.

11. The system of claim 9, wherein the selection circuitry is to compare the maximum first color value to the first threshold and, when the maximum first color value is not greater than the first threshold, set the fourth pixel to an error diffusion value for the fourth pixel.

12. The system of claim 9, wherein the neutral edge tag generation circuitry to apply the neutral pixel detector comprises the neutral edge tag generation circuitry to sum two or more color channels of the plurality of color channels and indicate a neutral pixel when the sum is not greater than a threshold.

13. The system of claim 9, further comprising:

color to key color conversion circuitry to suppress a second color channel of the second plurality of color channels for the first segment and the second segment based on the neutral edge tag signal and to selectively apply a gray to key color transform to the luminance channel of the scanned input image based on the neutral edge tag signal to generate the first color channel.

14. At least one non-transitory machine readable medium comprising a plurality of instructions that, in response to being executed on a computing device, cause the computing device to render a scanned image by:

receiving a scanned input image comprising a plurality of color channels;

generating a neutral edge tag signal for the scanned input image by applying edge detection to a luminance channel of the scanned input image, applying a neutral pixel detector to one or more color channels of the plurality of color channels, and indicating an asserted neutral edge tag for a pixel of the scanned input image when an edge and a neutral pixel are detected for the pixel or indicating a non-asserted neutral edge tag for the pixel when an edge or a neutral pixel are not detected for the pixel;

providing a color space conversion of the scanned input image to generate a second plurality of color channels;

applying error diffusion to at least a first color channel of the second plurality of color channels for a first segment of the scanned input image based on the neutral edge tag signal not being asserted to generate an error diffusion rendered segment of an output image, wherein applying the error diffusion comprises eliminating error propagation from a second pixel to a third pixel in response to a feedback signal indicating an error diffusion value for the second pixel was not selected for the second pixel in the output image; and applying a thresholding to at least the first color channel for a second segment of the scanned input image based on the neutral edge tag signal being asserted to generate a neutral edge enhanced segment of the output image, wherein applying the thresholding comprises setting a fourth pixel to a value associated with black when a maximum first color value in a window around the fourth pixel is greater than a first threshold and a first color channel value for the fourth pixel is greater than a second threshold, and setting the fourth pixel to a value associated with white when the maximum first color value is greater than the first threshold and the first color channel value for the fourth pixel is not greater than the second threshold.

15. The machine readable medium of claim 14, the machine readable medium comprising further instructions that, in response to being executed on a computing device, cause the computing device to render the scanned image by:

suppressing a second color channel of the second plurality of color channels based on the neutral edge tag signal by providing a value associated with white for the second color channel when the neutral edge tag signal is asserted.

16. The machine readable medium of claim 14, the machine readable medium comprising further instructions that, in response to being executed on a computing device, cause the computing device to render the scanned image by:

selectively applying a gray to key color transform to the luminance channel of the scanned input image when the neutral edge tag signal is asserted to generate the first color channel.

17. The machine readable medium of claim 14, wherein applying the thresholding comprises comparing the maximum first color value to a threshold and, when the maximum first color value is not greater than the threshold, setting the fourth pixel to an error diffusion value for the fourth pixel.

18. The machine readable medium of claim 14, wherein applying the neutral pixel detector comprises summing two or more color channels of the plurality of color channels and indicating a neutral pixel when the sum is not greater than a threshold.

* * * * *